United States Patent [19]

Harnden, Jr. et al.

[11] Patent Number: 4,967,568

[45] Date of Patent: Nov. 6, 1990

[54] CONTROL SYSTEM, METHOD OF OPERATING AN ATMOSPHERIC COOLING APPARATUS AND ATMOSPHERIC COOLING APPARATUS

[75] Inventors: John D. Harnden, Jr., Schenectady; William P. Kornrumpf, Albany, both of N.Y.

[73] Assignee: General Electric Company, Fort Wayne, Ind.

[21] Appl. No.: 439,540

[22] Filed: Nov. 20, 1989

Related U.S. Application Data

[63] Continuation of Ser. No. 173,502, Mar. 25, 1988, abandoned.

[51] Int. Cl.$^5$ ............................................. F25D 21/06
[52] U.S. Cl. ......................................... 62/155; 62/231
[58] Field of Search ................ 62/155, 157, 158, 231, 62/234, 140, 187, 182, 276; 310/332, 317, 358, 316; 200/181

[56] References Cited

U.S. PATENT DOCUMENTS

| | | | |
|---|---|---|---|
| 2,166,763 | 7/1939 | Mason | 175/320 |
| 3,559,420 | 2/1971 | Lipscomb | 62/158 |
| 4,332,142 | 6/1982 | Prada | 62/152 |
| 4,403,166 | 9/1983 | Tanaka et al. | 310/332 |
| 4,543,799 | 10/1985 | Horvay et al. | 62/283 |
| 4,553,061 | 11/1985 | Germano | 310/317 X |
| 4,626,698 | 12/1986 | Harnden et al. | 307/38 |
| 4,658,154 | 4/1987 | Harnden et al. | 307/132 R |
| 4,670,682 | 6/1987 | Harnden et al. | 310/332 |
| 4,689,517 | 8/1987 | Harnden et al. | 310/332 |
| 4,741,170 | 5/1988 | Tershak | 62/187 X |

OTHER PUBLICATIONS

Technical paper entitled "Refrigerator Control Systems", 60CPA5026, A.I.E.E. (1960).
Technical paper entitled "Ultra-Low Power Consumption Relay with Piezo-Actuator", Omron Tateisi Electronics Co., Kyoto, Japan.
Technical paper entitled "Application of Piezoceramics in Relays", Electrocomponents Science and Technology, 1976, vol. 3.

Primary Examiner—Harry B. Tanner
Attorney, Agent, or Firm—Ralph E. Krisher, Jr.

[57] ABSTRACT

A control system for regulating electrical power input to the refrigeration mechanism or defrost mechanism in an atmospheric cooling apparatus, including domestic refrigeration appliances, is provided which employs at least one piezoceramic relay device. The electrical power is applied with the piezoceramic relay device responsive to control signals and with the control circuitry being directly and ohmically connected to the power source. In one embodiment, the control means employs individual piezoceramic relay devices for power regulation to the respective mechanisms while in a different embodiment a single piezoceramic relay device regulates power input between the refrigeration mechanism and the defrost mechanism. A method of operating the controlled apparatus in such manner and a refrigeration apparatus having such control means are also disclosed.

187 Claims, 6 Drawing Sheets

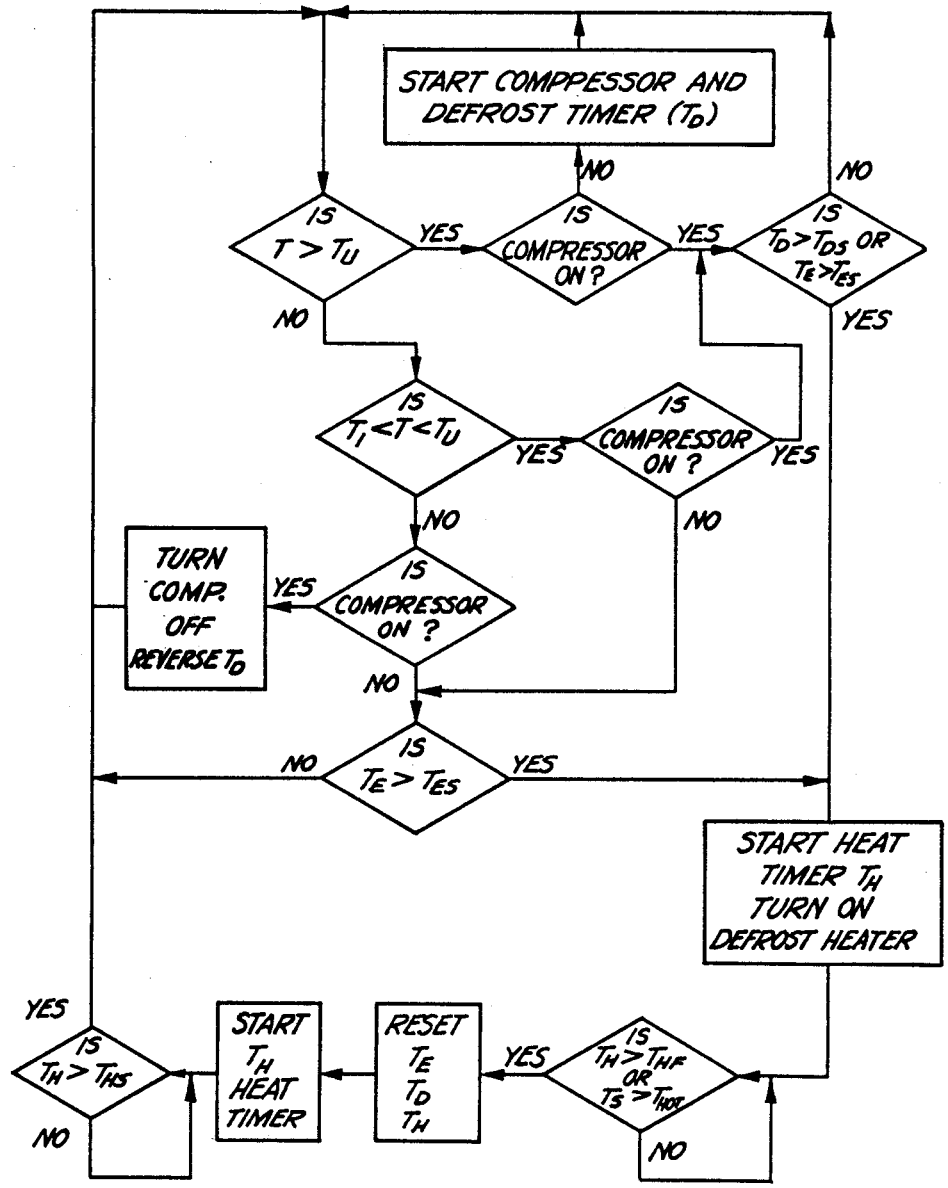

CONTROL SYSTEM, METHOD OF OPERATING AN ATMOSPHERIC COOLING APPARATUS AND ATMOSPHERIC COOLING APPARATUS

This is a continuation of copending application(s) Ser. No. 07/173,502 filed on Mar. 25, 1988, abandoned.

This invention relates to power switching circuitry employing at least one piezoelectric relay device and more specifically to the control of a particular type apparatus with such means.

BACKGROUND OF THE INVENTION

Piezoelectric relay devices are recognized to provide a means for either initiating or interrupting current flow to a load device. A known piezoceramic relay device for this purpose is disclosed in U.S. Pat. Nos. 4,670,682 and 4,689,517, both assigned to the assignee of the present invention. The relay device includes a piezoceramic bender member formed by at least two planar prepoled piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses. Movable contacts associated with the movable bender coact with fixed contacts disposed thereby to either complete or interrupt an electrical circuit providing current flow from a power source to the load device. A representative form of this type relay device as disclosed in the above mentioned prior art patents employs a piezoceramic bender member which is selectively prepoled with clamping means secured at non-poled portions adjacent to and mechanically supporting the selectively prepoled bender member in a cantilever manner for operating pairs of coacting electrical contact means and with the non-poled portions being mechanically unstrained and electrically neutral. The bender member is made to operate either side of a center position normally assumed by the bender member in an unenergized position to thereby enable different modes of operation. In one mode of operation, the relay device can simply serve as an on-off switch wherein one pair of coacting switch contacts either makes or breaks the electrical circuit with respect to the load device. In a different mode of operation, however, the pair of coacting switch contacts is provided on each side of the bender member to enable selective energization of multiple load devices. Both modes of operation with the prior art "bimorph" type bender switching devices are further said to be conducted in a similar manner wherein the DC energization potential used to actuate deflection of the bender member has the same polarity as the polarity of the prepoling potential used to prepolarize the prepoled piezoceramic plate elements. The depolarization avoided by operating the relay devices in this manner provides dipole enhancement enabling relatively long term operation with load devices employing load voltages as high as 5000 volts and corresponding currents as high as hundreds of amperes.

In both above defined modes of operation, such piezoceramic relay devices have been recognized to afford major operational and structural advantages over either electromagnetic (EM) relays or semiconductor devices when employed in power switching applications. These advantages are reported in U.S. Pat. No. 4,658,154, also assigned to the present assignee, which further includes disclosure of piezoceramic relay switching circuits providing control of single and double load apparatus. The EM relays still widely employed for this purpose provide an interface between, for example, an electronic control circuit and a load circuit wherein the former handles the low power control signals for selectively energizing the relay coil to appropriately position the relay contacts coacting in the power circuit to switch relatively higher levels of power. When such relay contacts are closed, load current is conveyed, with virtually no losses, and when they are parted, load current is interrupted with the certainty only an air gap can provide. Over the years improvements in EM relays have resulted in increased efficiency and reduced physical size. That is, such relays can be actuated with control signals of rather low energy content to switch reasonably high levels of load current. For example, EM relays are available which can be actuated with a one watt control signal to switch several kilowatts of power at 115 or 230 volts AC. As a consequence, EM relays can be operated with signals generated by solid state control circuitry. On the other hand, the drawbacks associated with EM relays employed for controlling current flow in load circuits responsive to control signals still remain substantial. While current EM relays have been miniaturized as compared to earlier designs of the relays, their actuating power requirements are still quite large in contrast to, for example, state of the art solid state power switches. The current EM relays are still relatively complex and expensive to manufacture, for example, their coils typically require a multitude of turns of very fine wire. The coil resistance consumes some power which must be provided by a reasonably stiff power supply. When, for example, EM relays are utilized in home appliance controls, relay operating power must be derived from a 115 or 230 volt AC utility source. The requisite power supply, particularly when an EM relay is operatively associated with a solid state control circuit, requires a transformer, electrolytic capacitors, regulators and protection to insure a reliable source of relay actuating current. Such power supplies are both costly and constitute a significant source of power dissipation. Moreover, in certain applications where high ambient magnetic fields are present, such as in motor starter applications, EM relays must be specially shielded to discourage spurious operation. The drawbacks associated with employment of EM relays in power switching circuitry has thereby resulted in a trend toward utilizing solid state switches, such as SCRs, Triacs, Thyristors, MOSFETs, IGTs and the like as the power switching output device. While such solid state switches are becoming relatively inexpensive and may be smaller in physical size than comparably rated EM relays, they do present a rather significant "on" resistance, which, at high current levels, results in considerable power dissipation. Thus, semiconductor power switches being utilized in high current applications must be properly heat-sinked for protection against thermally induced damage, and, as a consequence, with their heat-sinks can take up more physical space than do their EM relay counterparts. Moreover, solid state power switches must be protected against possible damage in spurious operation as a result of transients, electrostatic discharges (ESD) and electromagnetic interference (EMI). All of these protective measures represent an additional expense. In that such solid state power switches do not impose an air gap to restrain the flow of current in their "off" condition and because of their "on" condition failure mode, Underwriters Laboratory has disapproved their application in numerous domestic appliances. Such disapproval has only been overcome in part with a combination of the solid state switches and series connected EM relays in some domestic appliances so as to provide the required air gap.

All of the foregoing major disadvantages found with employment of either EM relays or semiconductor switches as the power switching output device has prompted renewed interest in piezoelectric relays, including piezoceramic relay devices. Recent improvements in piezoceramic materials have enhanced their electromechanical efficiency for these relay applications. Piezoceramic drive elements may be fabricated from a number of different polycrystalline ceramic materials such as barium titanate, lead zirconate titanate, lead metaniobate and the like which are precast and fired into a desired shape such as rectangular-shaped ceramic plates. The piezoceramic relay devices require very low actuating current, dissipate minimal power to maintain an actuated state, and draw no current while in their quiescent or unenergized state. The electrical characteristics of the piezoceramic drive elements are basically capacitive in nature, and thus are essentially immune to ambient electromagentic fields. Such piezoceramic relay devices can be designed in smaller physical sizes than comparably rated EM relays. Since piezoceramic relay devices utilize switch contacts, contact separation introduces the air gap in the load circuit as required for UL approval in domestic appliance applications. Closure of these relay contacts provides a current path of negligible resistance, and thus unlike solid state power switches, introduces essentially no loss in the load circuit. Since additional structural and operational advantages for such improved piezoceramic relay devices can be found in the aforementioned prior art U.S. Pat. Nos. 4,670,682 and 4,689,517, both disclosures are hereby specifically incorporated into the present application in their entirety.

The suitability of such piezoceramic relay devices in controlling current flow to a particular apparatus understandably requires still other factors to be considered. Both the operational characteristics desired in the apparatus as well as the environmental conditions being encountered have to be satisfied. For example, one major domestic air-cooling apparatus, namely the household refrigerator employs refrigeration means to keep the contents of a storage compartment from spoiling while the defrost means are usually included to remove frost accumulation from the refrigeration evaporator surfaces. It is desirable to control the operation of this domestic appliance and still other similar air-cooling apparatus so as to operate directly from the available line voltage power supply with a minimal number and size of components in the control circuitry and while further reducing any susceptibility of the control circuitry to EMI and line transients. Employment of at least one piezoceramic relay device in the control circuitry could theoretically enable current flow to be switched between the refrigeration and defrost mechanisms in such air-cooling apparatus most efficiently with relative immunity to ambient electromagnetic fields. The piezoceramic relay devices are further particularly suited for use in combination with low powerdrain electronic circuit components to provide the control signals for actuation of the piezoceramic bender member and thereby enable the relay contacts to be either opened or closed. It would be further desirable to replace the separate control means now being employed in the representative air-cooling apparatus to individually control the refrigeration and defrost mechanism with a single control unit employing at least one piezoceramic relay device. Such simplification would prove particularly attractive for the above illustrated household refrigeration appliance since it permits more space to be utilized for food storage and makes it easier to contain the entire control means within the apparatus for a cleaner design appearance.

Understandably, the ability of a piezoceramic relay device and its associated control circuitry to function properly in a relatively high humidity and low temperature environment that is associated with atmospheric cooling apparatus represents a still further important consideration. The relay contacts must open and close reliably in this operating environment over the relatively long lifetime demanded for most refrigeration apparatus. While piezoceramic devices have been found capable of long term reliable operation, significant contact problems are recognized to still exist and which have heretofore only been ameliorated with additional circuit means being employed. Specifically, contact arcing is experienced for different reasons as the relay contacts are opened and closed and which has required additional circuit means to reduce wear and tear at the contact interface. The arcing problem occurring when the contacts are opened is attributed to a rise of reapplied forward potential across the contacts as they open which can be lessened with snubber circuits as proposed in both aforementioned U.S. Pat. Nos. 4,658,154 and 4,670,682. The arcing problem which occurs when these contacts are closed is attributed to mechanical contact bounce upon closure and this problem is dealt with in a still further commonly assigned U.S. Pat. No. 4,626,698. As therein proposed, novel circuits are utilized with a piezoceramic relay device including circuit means to initially impress a relatively low voltage energizing potential across the piezoceramic bender member to slow its movement and curtail contact bounce after initial contact closure. It is also proposed therein that such circuits be operated to extinguish current flow through the contacts when being opened to help alleviate the former arcing problem. The seriousness of both arcing problems can be appreciated from a still further recommendation appearing in the reference for utilization of specialized contact metals to withstand arc formation whenever the relay contacts are being separated.

Recent legislation in many states now requires domestic appliances to meet minimum energy efficiency standards. For a domestic air-cooling apparatus, which includes refrigerators, air conditioners, heat pumps and the like, such a requirement understandably dictates efficient use of electrical power in both refrigeration and defrost mechanisms. A major problem in this regard occurs from the manner in which defrost mechanisms are operated in a great many of the present day domestic air-cooling appliances. For example, a typical household refrigerator controls the compressor motor operation in the refrigeration mechanism by thermostat means as a function of the sensed temperature. The associated defrost mechanism is controlled by energizing a defrost heater operated with a timer at periodic intervals. Since the defrost time cycle is fixed by the manufacturer at the time of manufacture, no provision is made for varying the defrost cycle with changes occurring in the operating environment. Accordingly, the interval during which the defrost mechanism is permitted to operate remains constant despite wide fluctuations being encountered in the humidity environment when the apparatus is being operated by a user. It becomes possible thereby for the defrost mechanism to overheat the evaporator surfaces in a low humidity environment and which has occasioned the incorporation of additional thermostat means for precautionary interruption of the defrost cycle. Moreover, a current trend whereby the entire control system for a household refrigerator and still other domestic air-cooling apparatus is being housed within the particular apparatus for appearance sake and reduced wiring costs has further drawbacks. The defrost timer motor now becomes subject to very high ambient humidities and low temperatures while further contributing heat which must be removed by the refrigeration mechanism. The latter drawback understandably decreases the overall thermal efficiency of the particular apparatus thereby making it that much more difficult to comply with the aforementioned minimum standards upon energy efficency in domestic appliances. Upon considering these energy efficiency standards, it also becomes evident that a proper control of an air-cooling apparatus having both refrigeration and defrost mechanisms should further preclude any simultaneous operation of the respestive mechanisms.

As recognized in the aforementioned U.S. Pat. No. 4,658,154, the operation of a piezoceramic relay to regulate power input to a pair of resistive load devices in a manner precluding simultaneous operation of the respective devices can be carried out with minimum power consumption. Such operational control of the relay device as therein recognized employs high voltage integrated circuitry being powered directly from a conventional utility source such as available 115 volt or 230 volt AC power sources. For such relay control circuitry to efficiently and reliably regulate power input to an atmospheric cooling apparatus having either a refrigeration mechanism alone or having a refrigeration mechanism operatively associated with a defrost mechanism, however, requires that a number and variety of still other important criteria be met. As important criteria applicable to regulate power input to either mechanism, there is understandable need for efficient power consumption, long term reliable operation of the selected power switching devices, and relatively low costs associated with structural implementation of selected power switching means in a particular apparatus. Such criteria can further be illustrated in connection with control means now being exercised in a typical household refrigerator. The conventional refrigeration mechanism controls temperature in one or more food storage compartments with a thermostat that controls the compressor motor as a function of sensed temperature. The conventional defrost mechanism controls operation of the defrost heater with a timer motor so that a defrost cycle is initiated after a fixed operating time interval of the refrigeration mechanism has elapsed. Since the defrost timer cycle is generally fixed to provide suitable defrosting in a heavy-use high-humidity environment, there exists excess defrost capability when the apparatus is operating in a low humidity environment. It follows that energy utilization is often less than optimum in the conventional power control system and that a control algorithm wherein less energy is used would prove beneficial. Replacing the separate electrical control means which now operate the refrigeration and defrost mechanisms in the conventional apparatus with a single control unit employing a piezoceramic relay device has further benefits. Wiring costs in the apparatus can be reduced while reliability of operation would be increased due to simplier electrical interconnections. The advent of reliable and inexpensive microprocessor control circuits as evidenced by their wide use in many current domestic appliances makes it further possible to automatically provide the actuating signals to a piezoceramic relay device satisfying the above defined control algorithm for a typical air-cooling apparatus. In so doing, a commercially available integrated circuit chip device could be programmed with the necessary logic and timing commands to carry out a selected control algorithm and with the control signals derived in a manner serving to operate the further integrated circuitry which actuates the piezoceramic relay device. The resulting control circuitry could then be directly and ohmically connected to a suitable power source and the terminal means of the piezoceramic relay device for minimal actuating power requirements and thereafter respond automatically to deflect in a first direction to complete an electrical circuit between the power source and the refrigeration mechanism or to deflect in a second direction to complete an electrical circuit between the power source and the defrost mechanism, all in a relatively fail-safe manner.

Deriving more energy efficient as well as simpler and more reliable control means for electrical power regulation to either refrigeration or defrost mechanisms being employed in a typical atmospheric cooling apparatus requires a still more detailed understanding of the conventional control algorithm. In the above illustrated typical household refrigerator, the current control algorithm provides a daily fixed time interval for defrost rather than providing defrost as needed. To further explain, there are two electrical power control elements in the present refrigeration control system. The first is the conventional cold control which is a hydraulic bulb thermostat that controls the compressor motor as a function of sensed temperature. The conventional cold control algorithm, as distinct from a true temperature feedback control, exercises temperature control over the interconnected frozen and fresh food compartments in the refrigerator with a single temperature monitoring control point. Since the conventional refrigeration systems do not reach their peak efficiency unless the compressor is allowed to operate for a sufficiently long time period, such as from fifteen to forty-five minutes to reach steady-state conditions, the present cold control is an engineering compromise between a tight control of the temperature at the monitoring point and suitable operation of the refrigeration system itself. During this minimum compressor run time, the temperature in either one of the two compartments may overshoot the desired temperature, while attempting to minimize the overshoot results in lowering the energy efficiency of the refrigerator. It is further evident that whenever a warm thermal load is added to either of the food compartments that a thermal transient will be experienced. Adequate cold control is achieved by monitoring the temperature in the fresh food compartment. In the conventional refrigeration mechanism the temperature of the evaporator exit air is monitored using a long time constant thermostat such that short perturbations in the exit temperature will not cause the temperature control to actuate. The exit air from the evaporator section is cold compared to that from the fresh food compartment temperature, since it is a blend of the fresh and frozen food air flows. Therefore, the present cold control requires a significant hysteresis such as 10°-13° F. for stable operation. This hysteresis also guarantees the minimum run and off times for the compressor due to the time constant of the evaporator and thermostat. The minimum run time is required for efficient operation while the minimum off time is required for the refrigerant gas pressure to equalize so that the compressor motor will not attempt to start with a high back pressure. By utilizing the exit air temperature from the evaporator, a measure of both fresh and frozen food compartments is factored into the measurement since air from both compartments is mixed within the evaporator. The use of exit air temperature further permits a degree of thermal anticipation for the temperature control system, whereby the levels of temperature overshoot experienced in the fresh food compartments are minimized, thereby limiting damage to low thermal mass loads such as lettuce. User operated means are further provided in the conventional refrigeration mechanism to adjust the compartment temperatures in an otherwise closed loop temperature control arrangement. Calibration of the conventional cold control means is further dependent upon the altitude where the apparatus is being operated. In contrast to the temperature feedback control means for operation of the conventional refrigeration mechanism, the second defrost control means in the conventional apparatus initiates a defrost cycle with a timer controlling the defrost heater to operate over a fixed time interval. Typically, a 500 watt heater is provided to periodically melt the accumulated frost from the evaporator surface to maintain the energy efficiency of the refrigeration apparatus. Present defrost timers typically initiate a defrost cycle whenever the compressor in the refrigeration mechanism has operated for a fixed number of hours. This is accomplished by wiring the defrost timer in parallel with the compressor motor. The present defrost timer cycle is further customized for particular refrigerator designs wherein the defrost cycle is now initiated once for each eight to sixteen hours of compressor run time, depending on the particular refrigerator heat exchanger design. The conventional defrost heater is thereby energized for a maximum time of one-half hour followed by a short off time for the gas pressure and temperature in the refrigeration mechanism to equalize. The present fixed time defrost mechanism becomes inefficient when the refrigerator is operating in the low humidity environment or when operating at low usage wherein a very small amount of frost accumulates on the evaporator surfaces and results in the evaporator being taken to very high temperatures with the 500 watt heater being energized for a thirty minute time period required only for a heavy frost accumulation. By reason of such possibility for overheating, the conventional control system further generally includes a defrost termination thermostat system whereby the defrost heater power is interrupted whenever the evaporator reaches a preset temperature. Understandably, further incorporation of this energy inefficient control system within the food compartment of the apparatus not only subjects all components to a high humidity and low temperature environment but requires that additional thermal loads being generated by the control system itself also be removed by the refrigeration mechanism. That a more energy efficient control algorithm is needed seems further evident from the considerable activity now taking place to develop frost sensing means as a replacement for the conventional fixed time defrost mechanism.

It is a principal object of the present invention to provide a more energy efficient system for the regulation of electrical power to the refrigeration and defrost mechanisms employed in an atmospheric cooling apparatus.

It is still another important object of the present invention to provide control means employing at least one piezoceramic relay device to regulate electrical power input to an atmospheric cooling apparatus in a more fail-safe manner.

A still further important object of the present invention is to provide control means for the regulation of electrical power to an atmospheric cooling apparatus which does not employ electromechanical timer means.

Still another important object of the present invention is to provide improved electronic control means for automatic regulation of electrical power to an atmospheric cooling apparatus.

A still further important object of the present invention is to provide a novel method for regulation of electrical power to an atmospheric cooling apparatus.

Still a further important object of the present invention is to provide a method of operating a piezoceramic relay means to more efficiently regulate electrical power input to an atmospheric cooling apparatus.

Still another important object of the present invention is to provide a more efficient method automatically regulating electrical power input to an atmospheric cooling apparatus.

Another important object of the present invention is to provide a more efficient atmospheric cooling apparatus utilizing novel control means to regulate electrical power to the refrigeration and defrost mechanisms.

Still another important object of the present invention is to provide an atmospheric cooling apparatus employing simpler control means to regulate electrical power input with piezoceramic relay means.

A still further immportant object of the present invention is to provide an atmospheric cooling apparatus employing improved electronic control means to automatically regulate electrical power input to the refrigeration and defrost mechanisms.

A still further important object of the present invention is to provide a domestic atmospheric cooling apparatus utilizing novel control means to regulate electrical power to the refrigeration and defrost mechanisms.

Another important object of the present invention is to provide a household refrigerator employing novel control means to automatically regulate electrical power input between the refrigeration and defrost mechanisms.

These and still further objects of the present invention will become apparent upon considering the following detailed description for the present invention.

SUMMARY OF THE INVENTION

Novel control means have now been discovered for regulating the electrical power input to either a refrigeration mechanism or a defrost mechanism employed in an atmospheric cooling apparatus which achieves all of the above noted desirable improvements.

In one aspect of the present invention, an improved control algorithm operates a defrost mechanism responsive to control signals determined by the operating time interval of a refrigeration mechanism but with operation of the defrost mechanism now being made more responsive to actual defrosting needs. While such improved defrost mechanism operates for a fixed time interval, the defrost cycle becomes time dependent in that initiation of the defrost cycle depends upon the operation of the refrigeration mechanism either for a predetermined time interval or whenever a predetermined operating time interval of the refrigeration mechanism is exceeded. A still further time dependence feature in such improved control algorithm enables operation of the defrost mechanism responsive to the control signals whereby the defrost cycle can be initiated following passage of a predetermined time interval subsequent to its preceding operation. To still further illustrate a suitable manner for carrying out such improved control algorithm with respect to a typical household refrigerator appliance, a control cirucit monitors the run time of the compressor in the refrigeration mechanism to establish a run interval value and with the run interval value being defined as that time when the compressor is running in excess of the time when the compressor has been off. Accordingly, if the refrigerator is operated for four hours with the compressor on three hours and off for one hour, the run interval value at that time would be two hours. If during the same four hour period the compressor has been running for two hours and then off for two hours, the run interval would be zero since there would be no excess compressor run time interval over the off time. Likewise, if the compressor has been on for one hour and off for three hours during a four hour period, the run interval value would still be zero since it is defined to be a positive number in accordance with the present control algorithm. A defrost cycle is initiated whenever the run interval exceeds a predetermined value or whenever a relatively long compressor run time period such as forty-eight hours has passed since the last defrost cycle.

In a different aspect of the present invention, single control means are employed to regulate power input between the compressor motor of the refrigeration mechanism and the defrost heater in the defrost mechanism. A single piezoceramic relay device effects the power switching with low energy consumption in a representative embodiment while the control circuitry actuating the relay device also operates in a comparable manner. The bender member of the piezoceramic relay device in this embodiment is made to operate either side of a center position normally assumed by the bender member in an unenergized position with the control circuitry being directly and ohmically connected to an available AC power supply as well as the terminal means of the piezoceramic relay device so as to respond to control signals for actuation of the piezoceramic bender member whereby the bender member is caused to deflect in a first direction to complete a circuit between the AC power source and the terminal means of the refrigeration mechanism or to deflect in a second direction to complete a circuit between the AC power source and the terminal means of the defrost mechanism. In such relatively fail-safe mode of operation it becomes evident that such control means can never initiate simultaneous cooling and heating and with substantially no electrical power being required to retain the electrical contacts of the relay in a closed operating position. A preferred piezoceramic relay device enabling such improved mode of operation utilizes the aforementioned "bimorph" construction wherein the piezoceramic bender member is formed by at least two planar prepoled piezoceramic plate elements being secured in opposed parallel relationship sandwich fashion on opposite sides of at least one central conductive surface and having outer conductive surfaces that are insulated from each other and the central conductive surface by the respective intervening piezoceramic plate element thicknesses. The movable electrical contact means operatively associated with the movable piezoceramic bender member can be disposed on the same side or opposite sides of the bender member as well as placed on side locations or even positioned upon extensions physically connected to the bender member, all as further described herein and in the aforementioned patent references. A still further preferred form of the piezoceramic bender member having the "bimorph" construction is selectively prepoled with clamping means being secured at non-poled portions adjacent to and mechanically supporting the selectively prepoled bender member in a cantilever manner for operating single or multiple pairs of coacting electrical contacts, the non-poled portions being mechanically unstrained and electrically neutral.

The control circuitry operating the piezoceramic relay device with low power consumption is connected in circuit relationship across respective ones of the prepoled piezoceramic plate elements to provide DC energization potential for selective deflection of the bender member responsive to control signals derived during operation of associated refrigeration or defrost mechanisms. The DC energizing potential is preferably provided with the same polarity as the polarity of the prepoling potential used to polarize the piezoceramic plate elements so as not to depolarize the relay during operation. Actuation of the relay device responsive to the control signals can be provided with associated low power drain electronic circuit means. More particularly, a suitable relay drive circuit means for the household refrigerator appliance above illustrated can simply include a diode-capacitor network for developing the high voltage DC energizing potential for operation of the piezoceramic relay device in combination with dropping resistor means for the control logic and semiconductor active devices for selectively applying the high voltage energization to the piezoceramic bender member. In such drive circuit means, series connected isolating resistor means can be provided to limit the current drawn from an AC power source while charging resistor means can also be provided to conduct the energizing potential to the piezoceramic bender member. Such drive circuit embodiments can also include further resistor means to discharge the first piezoceramic plate element when energization thereof has been terminated along with second resistor means to discharge the second piezoceramic plate element when its energization has been terminated. Automatic switching of the relay contacts can be provided with operatively associated electronic circuit means such as various already available integrated chip devices. For example, a CMOS control circuit can be programmed in a known manner with all of the temperature and timing values enabling regulation of a controlled air cooling apparatus in such manner. Such representative digital integrated circuit means is simply programmed in the known manner with maximum and minimum temperature set points being established for temperature feedback control of the refrigeration mechanism so that the compressor is actuated at one predetermined temperature and its operation terminated at a second lower temperature. Further temperature control signals for operation of the refrigeration mechanism in an automated manner can be derived if the programming software is made further responsive to user input settings establishing desired temperature levels in one or more of the food storage compartments. In such manner a solid state chip device can be customized to provide control signals for operation of the defrost mechanism in various predetermined time sequences. Initiation of the defrost cycle can simply be derived with the timing signals being established by counting the available 60 cycle AC line. By such representative control means the associated chip device provides all of the timing, temperature sensing measurement and relay drive functions for the control algorithm with a minimal number of external circuit components being required in the overall control circuitry. Such use of on-chip or integral temperature sensing eliminates the need for separate packaging and connection of the sensor and biasing components otherwise required. Accordingly, still other like chip devices can be employed in the present overall control circuitry to drive the piezoceramic relay device directly from the chip such as that provided with high voltage MOS technology which is already in commercial manufacture. To further illustrate, one such commercially available chip device is reported to achieve 500 volts, and utilizes low current drain (10–20 milliamperes) drive transistors for the active devices which may be further located on chip. In a similar manner, other known integrated chip devices can be programmed to derive all of the timing, temperature measurement and relay drive functions needed in the present control circuitry. For example, it would also be possible to use a simple CMOS microprocessor-control based chip having the capability for on-board analog-to-digital conversion such that the user set point and temperature feedback signals can be converted within this controller with a minimum of external components. It will also be apparent that various type semiconductor elements other than transistors can be employed for the active devices in the above illustrated overall control circuitry. Accordingly, numerous processes are known for producing high voltage, low current devices applicable to the present control circuitry such as CMOS, DMOS, PHMOS, NMOS, etc. By high voltage, low current is meant voltages in the 300 to 600 volt range and currents in the low milliamp range. Suitable candidates are the monolithic DMOS FET arrays offered by Supertex, Inc (2NT001), 2N9001 MOS-FETS offered by Siliconex, and ETO12PC GTO transistor arrays offered by Hitachi. A typical software flow chart enabling fully automated operation in one type atmospheric cooling apparatus employing a refrigeration and defrost mechanism is hereinafter further described in connection with the following preferred embodiments.

Considerable energy savings can be made possible with employment of the above illustrated power regulation embodiments. Such representative control means contributes to energy savings in three major ways. As further explained in connection with a typical household refrigerator appliance, the first reduction occurs in lower power dissipation in the food compartment due to a replacement of the electromechanical timer with lower power consumption control circuitry. A second likely reduction is believed to be in a reduced number of defrost cycles which can be made possible by using an improved control algorithm. A third power reduction can be made possible by operating the compressor with minimum on and off times which should increase the thermal efficiency of the refrigeration mechanism. Since the conventional timer motor utilizes approximately 3.9 kilowatt hours per year during operation while the additional compressor energy required to remove this heat is approximately 9.8 kilowatt hours per year, there is a total of 13.7 kilowatt hours now being expended with the conventional control system. Replacement of the conventional control arrangement with CMOS electronic control circuitry utilizing power consumption in the range of approximately 1.5 kilowatt hours per year should realize energy savings of 12.2 kilowatt hours on a yearly basis. Of greater significance, however, is the power consumption being utilized by the conventional household refrigerator appliance which operates the defrost heater for up to one-half hour for each 8–16 hours of compressor operation. A possible 650 defrost cycles per year can result in the conventional appliance for an energy expenditure of approximately 164 kilowatt hours due to energy consumption in the defrost cycles alone. Employment of the above illustrated control algorithm improvement should reduce the annual number of defrost cycles to as low as 182 cycles in the same environment for a savings of 116 kilowatt hours per year, assuming that the conventional 500 watt defrost heater is retained.

In still different aspects of the present invention in connection with an atmospheric cooling apparatus having a refrigeration mechanism operatively associated with a defrost mechanism, the present control means can be modified so as to enable power regulation to each mechanism with an individual piezoceramic relay device. Thus, power regulation to a representative refrigeration mechanism utilizes a first such relay device connected in circuit relationship to enable connection to the refrigeration mechanism, the piezoceramic relay device including terminal means for connection to the power source and a movable prepoled piezoceramic bender member having movable electrical contact means which coact with fixed electrical contact means disposed thereby, the fixed electrical contact means being connected to terminal means of the refrigeration mechanism, and the piezoceramic bender member maintaining the movable electrical contact means spaced apart from the fixed electrical contact means while in an unenergized condition, and control circuitry directly and ohmically connected to the power source and the terminal means of the piezoceramic relay device which responds to control signals for actuation of the movable piezoceramic bender member and causes the bender member to deflect and complete a circuit between the power source and the terminal means of the refrigeration mechanism. Control signals for actuation of this piezoceramic relay device can be derived with temperature feedback control, as above pointed out, so that actuation takes place at one predetermined temperature and termination occurs at a predetermined lower temperature. Power regulation to a representative defrost mechanism in the herein illustrated atmospheric cooling apparatus utilizes a second piezoceramic relay device connected in circuit relationship to enable connection to the defrost mechanism, the piezoceramic relay device including terminal means for connection to the power source and a movable prepoled piezoceramic bender member having movable electrical contact means which coact with fixed electrical contact means disposed thereby, the fixed electrical contact means being connected to terminal means of the defrost mechanism, and the piezoceramic bender member maintaining the movable electrical contact means spaced apart from the fixed electrical contact means while in an unenergized position, and control circuitry directly and ohmically connected to the power source and terminal means of the piezoceramic relay device which responds to control signals for actuation of the movable piezoceramic bender member and causes the bender member to deflect and complete a circuit between the power source and the terminal means of the defrost mechanism. As further above pointed out, the control signals for actuation of the second piezoceramic relay device can be derived in accordance with the above illustrated control algorithm improvement whereby the time interval during which the defrost mechanism is operated is determined by the operating time interval of the operatively associated refrigeration mechanism. Additionally, there can be included in such multiple relay device embodiment known structural and/or circuit means precluding simultaneous actuation of the relay devices.

Employing a piezoceramic relay device as disclosed in any of the preceding illustrative embodiments provides several important advantages with respect to power regulation for an atmospheric cooling apparatus. A number of EM relays are employed in the conventional apparatus for this purpose and with the relay devices being located at different places in the apparatus. The power demands for these relays further requires that considerable heavy power wiring be employed for the associated control circuitry. Lower power requirements and a simple structure for the piezoceramic relay device now enables the entire control means for the apparatus to be centrally located in a minimal space and with significantly reduced wiring costs. It becomes now possible in connection with other aspects of the present invention to configure the improved control means as a single plug-in module enabling repair or replacement in a far more convenient manner. The conventional apparatus further employs thermostat means for temperature control of both refrigeration and defrost mechanisms in order to provide control signals at a sufficient power level to actuate the operatively associated EM relay devices. A drawback now experienced with the electromechanical temperature control means is lack of control outside the controlled temperature band of the thermostat device. Ability to actuate a piezoceramic relay device with lower power level electronic circuitry enables electronic temperature control means to now be employed, such as with a solid state thermistor device. The electronic temperature sensing means provides continuous feedback signal over a far wider temperature range than required in an atmospheric cooling apparatus and hence can serve in providing control signals based on temperature conditions occurring within and outside of the controlled temperature band. Of particular significance in this regard is elimination of the common practice in conventional atmospheric cooling apparatus wherein the compressor is permitted to run for long periods of time when the temperature in the apparatus resides outside the controlled temperature band selected by a user. Such operation can overheat the compressor motor so that it becomes desirable to alleviate such overrun condition with a continuous temperature feedback control signal whenever electrical power is being supplied to the apparatus. Achieving more precise temperature control in the apparatus by such means has still further benefits including avoidance of a freeze-thaw cycle occurring in the refrigerated articles. Moreover, a household refrigrator appliance can now be made far more responsive to variation in thermal loads encountered in the apparatus from user operation, such as opening the gasketed doors or placing warm articles in the food storage compartments. Providing such improved temperature control signals to a piezoceramic relay device regulating power to the atmospheric cooling apparatus is not difficult. The aforementioned electronic control circuitry operatively associated with the relay device can simply incorporate a solid state thermistor element connected in already known circuit relationship with temperature set points for its operation and to further include a user temperature set point if dealing with a household refrigerator appliance.

Operation of the defrost means in an atmospheric cooling apparatus can further be improved in accordance with still other aspects of the present invention. The radiant energy heaters now employed in the conventional apparatus are energy inefficient in utilizing far more electrical energy than is required to melt the frost accumulation particularly upon further considering that all excess thermal energy must be removed with the associated refrigeration means. It has now been found that a positive temperature coefficient (PTC) electrical heater can replace the conventional defrost means with considerable energy savings being realized. Such PTC heater means comprises already widely used electrical cable which is often wrapped around water pipes to protect against freezing or used to defrost household roof gutters and with the electrical resistance in the cable increasing rapidly so that around 60° C. there is very little heat generated by the device. Commercially available cable of this type is now being sold by Raychem Corporation as well as by Ensign-Bickford and other suppliers. A typical cable construction includes two parallel copper conductors surrounded by a carbon filled polyethylene heating element which is electrically insulated with a polyethylene jacket. For improved defrost efficiency in an atmospheric cooling apparatus, the heater cable can simply be inserted between the fin elements normally employed in the evaporator section of a conventional refrigeration mechanism or placed in close physical proximity thereto. In this environment, the cable experiences a large increase in electrical resistance above 50° C. thereby limiting the power being dissipated and the ultimate temperature reached. More particularly, if frost is not found at a location in the evaporator then the cable becomes hotter increasing its electrical impedance and thereby decreasing the wattage used by the cable. In this manner, the cable automatically and efficiently regulates the heat input over the entire evaporator surface area being defrosted as essentially a distributed continuous length of integrated heating elements in parallel. Both cost of operation and quality of food preservation are understandably improved with this type defrost mechanism. Certain other materials including barium titanate, vanadium compounds and other electrically conductive loaded polymers exhibit similar non-linear resistance characteristics with temperature change and hence can also prove useful for this improved defrost means. Accordingly, it is further contemplated to employ such improved defrost means in combination with the power regulation means of the present invention. A still more comprehensive treatment of the various defrost techniques and the modes of operation thereof which have been employed in atmospheric cooling apparatus can be found in a technical manuscript entitled "Refrigeration Control Systems" AIEE Paper 60CPA5026, presented May 16–17, 1960.

BRIEF DESCRIPTION OF THE DRAWINGS

FIG. 7 is a typical flow chart for automated power control as carried out employing the FIG. 6 circuitry.

DESCRIPTION OF THE PREFERRED EMBODIMENTS

Figure 1:
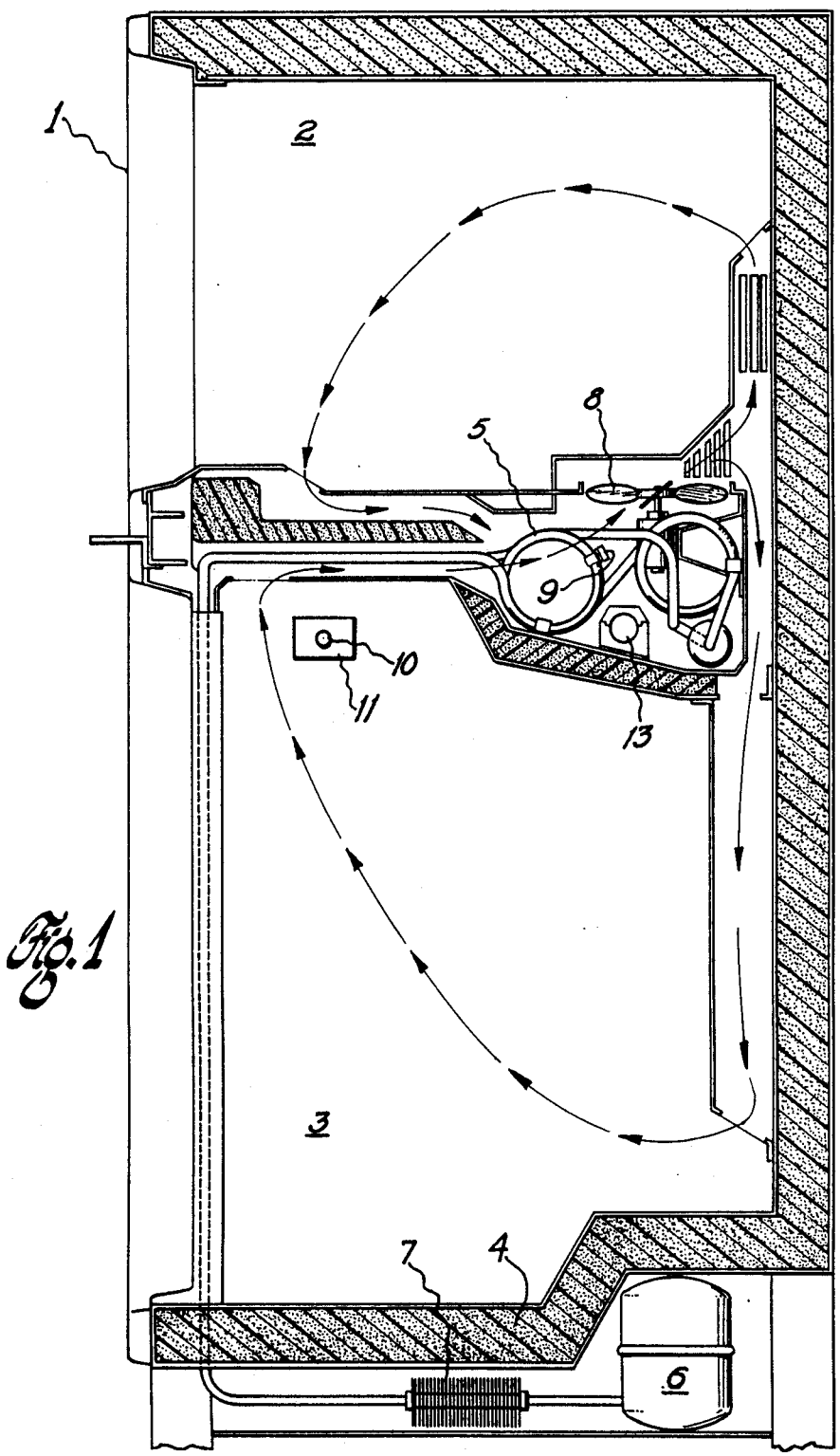
FIG. 1 is a front perspective view for a typical household refrigerator including one form of the presently improved control means.

Referring now more specifically to the drawings, the preferred embodiments of the present invention are illustrated in connection with an atmospheric cooling apparatus in the form of a household refrigerator of the type more fully disclosed in U.S. Pat. No. 4,543,799, issued Oct. 1, 1985 to Julius B. Horvay et al. This patent is assigned to the General Electric Company and its disclosure is specifically incorporated herein by reference. As shown in FIG. 1, there is illustrated a refrigerator cabinet including an outer case 1, having an upper freezer storage compartment 2 along with a lower fresh food compartment 3. Both storage compartments are contained within insulative material 4 and are further provided with access openings to both compartments closed by gasketed doors (not shown). Refrigeration for the two compartments is provided by an evaporator 5 which is positioned between the two compartments with the refrigeration mechanism further including an electric motor driven compressor 6 and a condensor 7. A fan 8 is located in ductwork connecting the storage compartments to provide means for circulating air from the two compartments over the evaporator 5 and back into the compartments. Thermostat means 9 is provided for automatically controlling the operation of compressor 6 so as to maintain the temperature within the storage compartments within a controlled range by means of still further operatively associated relay control means 10 housed within the fresh food compartment. Evaporator 5 operates at temperatures below freezing and for the purpose of periodically removing accumulated frost from the evaporator surface, there is provided a defrost heater 13 which is also periodically energized by the present relay control means 10.

Figure 2:
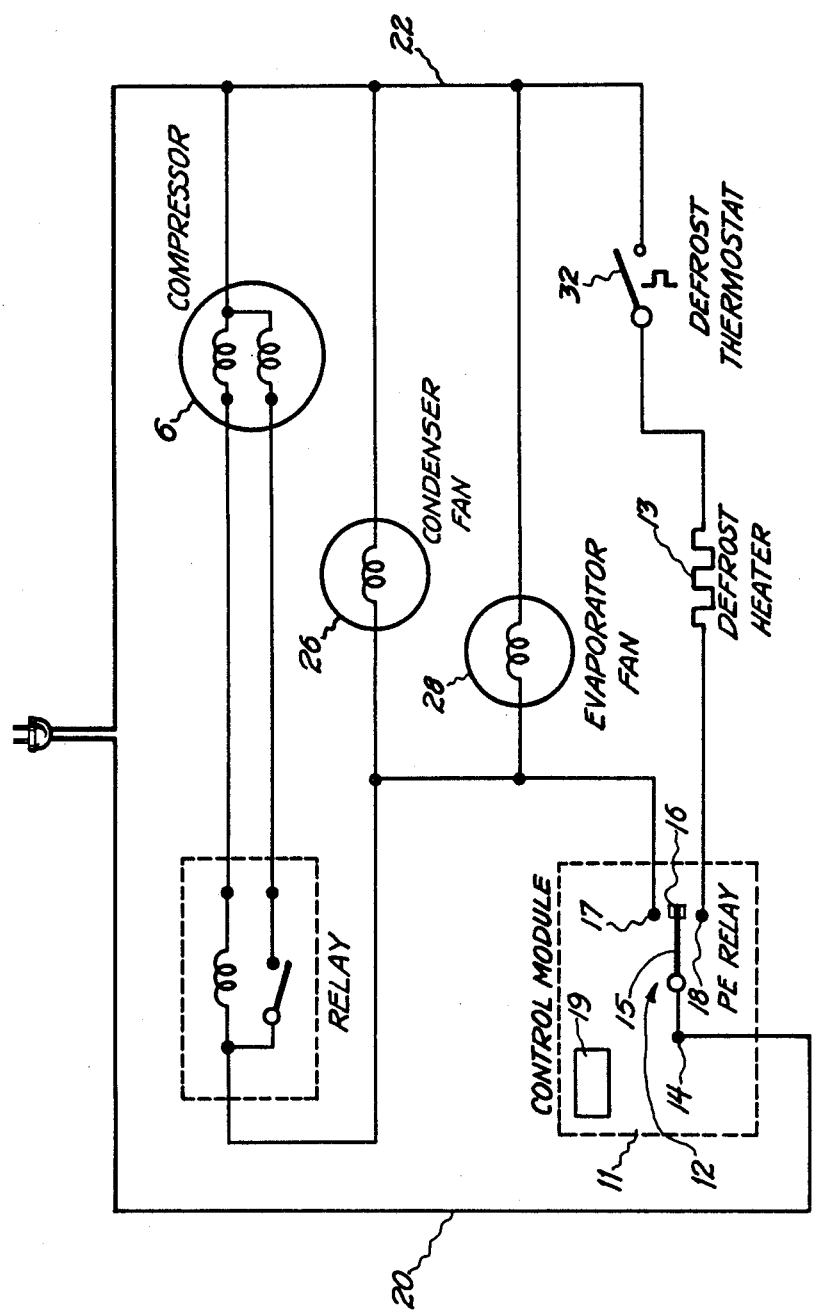
FIG. 2 is an electrical circuit diagram for representative control means suitable in the FIG. 1 apparatus.

The operation of the representative control means 10 is better illustrated by reference to the electrical circuit diagram therefor as depicted in FIG. 2. More particularly, a single control module 11 is provided in the fresh food compartment having a piezoceramic relay device 12 for regulating electrical power input between the refrigeration mechanism and the defrost mechanism in the above described refrigerator appliance. In so doing, the piezoceramic relay device 12 is connected in circuit relationship to enable individual connection of the household AC power source to either refrigeration or defrost mechanism, with the piezoceramic relay device including terminal means 14 for connection to the AC power source and a movable prepoled piezoceramic bender member 15 having a pair of movable electrical contact means 16 which coact with a pair of fixed electrical contact means 17 and 18 disposed thereby and with the pair of fixed electrical contact means being separately connected to terminal means of the refrigeration and defrost mechanism, the bender member being made to operate either side of a center position normally assumed by the bender member in an unenergized position as shown on the drawing. Operatively associated circuitry 19 also housed within the control module 11 actuates the piezoceramic relay device responsive to control signals causing the movable prepoled piezoceramic bender member 15 to deflect either in a first direction which completes a circuit between the AC power source and the terminal means of the refrigeration mechanism or to deflect and complete an electrical circuit between the AC power source and the terminal means of the defrost mechanism. For controlled operation of the refrigerator appliance in this manner which avoids simultaneous operation of the refrigeration mechanism and defrost mechanism, the condense and the evaporator fan motors 26 and 28 are connected in parallel to one supply conductor 20 through the control module 11 with the compressor, evaporator fan and condenser fan motors 6, 26 and 28 each having return electrical connections to the remaining supply conductor 22. Corresponding control of the defrost mechanism is exercised by having the defrost heater 13 also parallel connected in the control circuitry 19 through the control module 11 and with additional thermostat means 32 also being series connected with the defrost heater. In the presently controlled mode of operation the time interval during which the defrost mechanism is operated responsive to the control signals is determined by the operating time interval of the refrigeration mechanism. Control signals for actuating the defrost mechanism in this manner are entirely derived in the illustrated control embodiment and which can further provide for initiation of the defrost cycle whenever a predetermined operating time interval of the refrigeration mechanism has elapsed. Additionally, further control signals can be derived by the control module wherein a defrost cycle can be initiated following passage of a predetermined time interval subsequent to a preceding defrost cycle. A similar control of the refrigeration mechanism in the illustrated refrigerator embodiment is exercised by the control module. Accordingly, the thermostat means 9 is employed to furnish control signals to the control module for compressor actuation at one predetermined temperature and to terminate compressor operation at a second lower temperature. This mode of operation can be carried out automatically within the control module whereby first control signals are derived representing the difference between the sensed temperature and the predetermined second lower temperature while the compressor is operating until the sensed temperature difference reaches zero whereupon the electrical contacts of the piezoceramic relay device causing the compressor to operate are then opened. This temperature control band is independent of altitude and can be made as small as desired to avoid continuous melting and freezing of the stored food. Other modifications can also be made in the illustrated refrigeration mechanism for automated operation by the control module. Thus, frost sensing means (not shown) can be located adjacent to the evaporator surfaces with control signals derived therefrom being implemented with the present control embodiment. Thermal protection means can also be provided in the illustrated refrigeration mechanism for automatic interruption of the compressor operation, if needed, by the control module.

Figure 3:
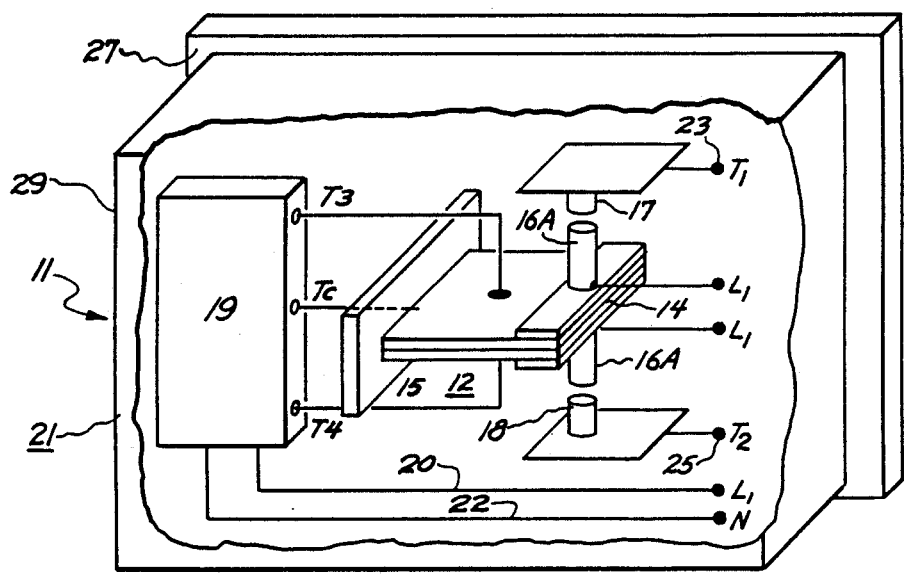
FIG. 3 is a more detailed structural view of a typical control module having the relay device and circuitry described in FIG. 2.

In FIG. 3 there is depicted a more detailed structural view for the control means illustrated in the immediately preceding embodiment. As more particularly defined in the FIG. 2 drawing, the control module 11 physically incorporates all of the control means required to regulate power input to the refrigeration and defrost mechanism employed in the illustrated apparatus. Accordingly, the piezoceramic relay device 12 and its operatively associated control circuitry 19 are housed within a box-like enclosure 21 along with terminal means enabling electrical connection to the respective mechanisms. The box-like enclosure includes an electrically insulative base 27 which can be conveniently secured within the refrigerator cabinet and further includes cover means 29 to protect the housed electrical components against frost accumulation. Piezoceramic relay device 12 and its control circuitry 19 are affixed to the insulative base member 27 as are the power source connections 20 and 22 and both terminal connections 23 and 25 to the controlled mechanisms. As can be further seen in the present drawing, electrical connections extend from one power conductor 20 to the control circuitry 19 while further connecting with the movable contacts 16A in the piezoceramic relay device 12. The remaining power conductor 22 is simple series connected to the control circuitry 19 as well as connected outside control module 11 (not shown) to both refrigeration and defrost mechanisms thereby enabling completion of the electrical power circuits thereto. In doing so, actuation of the movable bender member responsive to control signals causes the bender member to deflect and make contact with one of the coacting fixed electrical contacts 17 and 18 which are disposed adjacent to the movable contact means. When the bender member 15 is unenergized by reason of not having control signals being applied by the associated control circuitry 19, the movable contacts 16A remain spaced apart from both coacting fixed electrical contacts 17 and 18 with the result that no electrical power can be applied to either controlled mechanism.

Figure 4A:
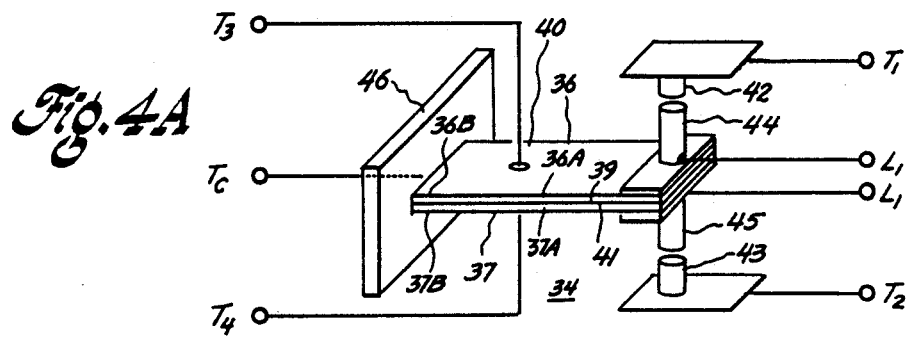
FIGS. 4A, 4B and 4C comprise longitudinal side view of three different forms of a piezoceramic bimorph type relay device suitable for use in the present control means.
Figure 4B:
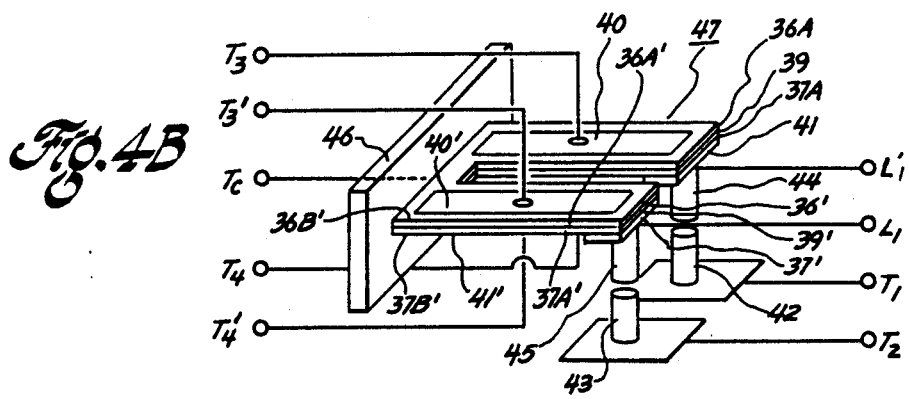
Figure 4C:
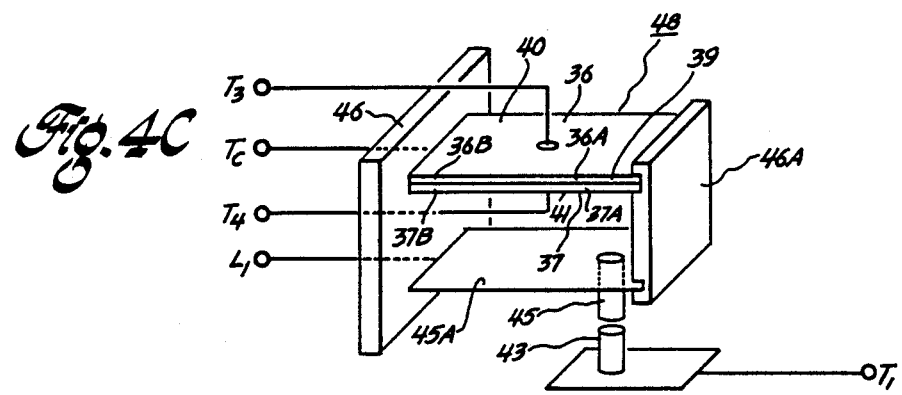

FIGS. 4A, 4B and 4C provide longitudinal side views of three different constructions for a piezoceramic bimorph type relay device which can be used in the present control means. The relay device in FIG. 4A enables long term reliable operation in the manner previously described in connection with FIGS. 1-3 wherein power is switched between the refrigeration and defrost mechanisms with a single relay. The relay device shown in FIG. 4B represents a different structural form enabling power to be supplied to either refrigeration or defrost mechanism upon deflection of separate bender elements in the same direction. The relay device in FIG. 4C depicts a still different structural embodiment having remotely disposed movable contact means operatively associated with a single bender element as well as remote terminal means for connection to the power source. The latter device is also suitable for supplying power to either refrigeration or defrost mechanism with a pair of the relays being required to supply power to both mechanisms. All of the depicted relay embodiments are operated in a similar manner with the present control circuitry, however, in that a movable bender member is caused to deflect responsive to the control signals and complete a circuit between the power source and terminal means separately connected to the respective mechanisms in the controlled apparatus. For this reason, the same letter and numeral identifications are employed in the present drawing to designate common structural elements in the respective relay embodiments as well as common terminal connections in so far as possible.

In FIG. 4A, the piezoceramic bender type switching device 34 is formed having at least two planar piezoceramic plate elements formed by an upper plate 36 and a lower plate 37 as seen on the drawing. The piezoceramic plate elements 36 and 37 are secured in opposed parallel relationship sandwich fashion on opposite sides of at least one central conductive surface 39 and having respective outer conductive surfaces 40 and 41 that are insulated from each other and the central conductive surface 39 by the respective intervening piezoceramic plate element thicknesses. The piezoceramic plate elements 36 and 37 may be formed from lead zirconate titanate, lead metaniobate, barium titanate or other known piezoceramic materials. The conductive surfaces 39, 40 and 41 may be formed with nickel, silver or other like conductive materials deposited or otherwise secured to the plate elements 36 and 37. The bender-type piezoceramic switching device further includes one set of coacting fixed electrical switch contacts 42 and 43 mounted on relatively rigid support means and which may be sufficiently flexible to absorb impact and closed upon deflection of a prepolarized movable bender portion comprised by the piezoceramic plate elements 36A and 37A of the bender-type switching device. The contacts 42 and 43 coact respectively with electrically insulated contacts 44 and 45 formed on the movable end of the bender device 36, 37 when actuated by control signals provided in accordance with the present control means. The movable bender portions 36,37 of the piezoceramic switching device 34 are physically supported in a cantilever manner by clamping means shown at 46 which serves to both physically hold and clamp together the piezoceramic plate elements 36 and 37 with the central conductive surface 39 being sandwiched therebetween. Clamping means 46 is disposed over portions 36B and 37B of the piezoceramic plate elements 36 and 37 which have not been prepolarized and therefore are unpoled and electrically neutral as opposed to the prepolarized active movable bender portions 36A and 37A of the plate elements on which the contacts 44 and 45 are provided. Preferably the clamping means 46 is disposed over the ends of the non-polarized or unpoled portions 36B and 37B which are immediately adjacent to and physically integrated with the ends of the prepolarized active movable bender portion comprised by plate element portions 36A and 37A which have been prepolarized. It has been discovered that by mounting the piezoceramic plate elements in this manner, the number of failures due to fracturing the ceramic material at their support points is greatly reduced. Terminal means $T_3$, $T_4$ and common terminal $T_c$ provide the means whereby DC energizing potential is selectively and respectively applied across the prepolarized active movable bender plate portions 36A and 37A responsive to control signals provided with the present control circuitry 19 (not shown). Such energizing potential also being applied with the control circuitry causes the movable bender portions to selectively deflect and close their contacts 44 and 45 on either of the coacting fixed contacts 42 and 43, respectively. Upon the closing of one pair of coacting contacts, an electrical circuit is completed between terminals $L_1$ which are connected to the power source, and either of the further terminals $T_1$ and $T_2$ which are separately connected to terminal means in the refrigeration and defrost mechanisms of the controlled apparatus. Accordingly, an upward deflection of the bender member completes an electrical circuit between the power source and terminal $T_1$ whereas a downward deflection of the bender member completes a similar circuit to terminal $T_2$. Upon removal of the DC energizing potential to either terminal $T_3$ or $T_4$, the active movable bender portion returns to its center neutral unenergized position thereby opening whichever set of coacting contacts 42,44 or 43,45 has been closed.

The piezoceramic bender-type switching device 47 being depicted in FIG. 4B has a general structural configuration similar to the above described relay embodiment hence the same letter and numeral identification has been retained to designate common structural elements in the present relay device. The present device is dissimilar in having a pair of bifurcated movable bender portions 36A,37A and 36A',37A' which are separately actuated for completion of electrical circuits to terminals $T_1$ and $T_2$. In so doing, the movable contacts 44 and 45 are secured on the same side of the individual movable bender portions 36A,37A and 36A', 37A', respectively, to enable the desired independent actuation of the defrost and refrigeration mechanisms. Separate terminal means are also provided to the individual movable bender portions whereby DC energizing potential can be individually applied across the ceramic plate elements of each movable bender portion along with separate terminal means provided for completion of the individual circuits between the power source and one of the controlled mechanisms. Accordingly, terminal means $T_3$, $T_4$ and common terminal $T_c$ provide the means whereby DC energizing potential is selectively and respectively applied across the prepolarized active movable bender plate portions 36A and 37A in response to the control signals whereas terminals $T_3'$, $T_4'$ and common terminal $T_c$ provide corresponding means for the movable benderr plate portions 36A' and 37A'. Upon the closing of coacting contact pair 42,44, an electrical circuit is completed between terminal $L_1$ which is connected to the power source, and terminal $T_1$ which is connected to terminal means in either the refrigerator or defrost mechanism. In a similar manner, the closing of coacting contact pair 43,45 completes an electrical circuit between terminal $L_1$ which is also connected to the power source, and terminal $T_2$ which is connected to the other mechanism. As can be further noted in the drawing, both electrical circuits are completed with a downward deflection of the bifurcated movable bender portions and with the movable bender portions maintaining the coacting contact means spaced apart while in an unenergized condition. Both control signals and energizing potential enabling separate actuation of the individual movable bender portions are again provided with the present control circuitry (not shown).

The piezoceramic bender-type switching device 48 depicted in FIG. 4C also has a general structural configuration similar to the FIG. 4A embodiment so that once again the same letter and numeral identification is retained in the present drawing to designate the common structural elements. As can be noted from the present drawing, however, the employment of a single pair of coacting contact means in this relay embodiment enables power to be applied but to a single mechanism (refrigeration or defrost). Accordingly, the piezoceramic plate elements 36 and 37 are secured in opposed parallel relationship sandwich fashion on opposite sides of at least one central conductive surface and having respective outer conductive surfaces 40 and 41 that are insulated from each other and the central conductive surface 39 by the respective intervening plate element thicknesses. The bender-type switching device further includes one pair of the coacting contact means 43,45 which are closed by downward deflection of a prepolarized movable bender portion comprised by piezoceramic plate elements 36A and 37A of the bender-type switching device. In this regard, however, it can be noted that movable contact element 45 is disposed upon an electrically conductive spring element 45A and with both the movable bender portion and the spring element being joined together with an insulating block element 46A for common movement. By further electrically connecting the spring element 45A to the power source as shown in the present drawing, no further need arises to connect the movable contact with a wire conductor or "flying lead" as employed in the preceding embodiments. The movable bender portions 36,37 of the piezoceramic switching device 48 together with the spring element 45A are physically supported at the opposite ends in a cantilever manner by the clamping means shown at 46 and which again serves to both physically hold and clamp together the piezoceramic plate elements 36 and 37 with the central conductive surface 39 being sandwiched therebetween. The clamping means 46 is disposed over portions 36B and 37B of the piezoceramic plate elements 36 and 37 which are not prepolarized and therefore are unpoled and electrically neutral as opposed to the prepolarized active movable bender portions 36A and 37A of the plate elements. Again, the terminal means $T_3$, $T_4$ and common terminal $T_c$ provide the means to supply DC energizing potential across the prepolarized active movable bender plate portions 36A and 37A in response to the control signals and which is all supplied with the present control circuitry (not shown). Upon closing the pair of coacting contacts 43, 45 responsive to the control signals it can again be noted that an electrical circuit is completed between the power source connected to the spring element 45A at terminal $L_1$ and one of the controlled mechanisms (refrigeration or defrost) connected to terminal $T_1$. It will be further apparent in this embodiment that removing the DC energizing potential to either terminal $T_3$ or $T_4$ causes the active movable bender portion to open the coacting contact pair and which remain spaced apart while the member is in an unenergized condition. It will be further apparent to one skilled in the art that similar individual regulation of power input to a second mechanism (refrigeration or defrost) in the atmospheric cooling apparatus can be provided with a second piezoceramic bender-type switching device having the same construction and likewise series connected as herein shown to the second mechanism in the apparatus.

Figure 5:
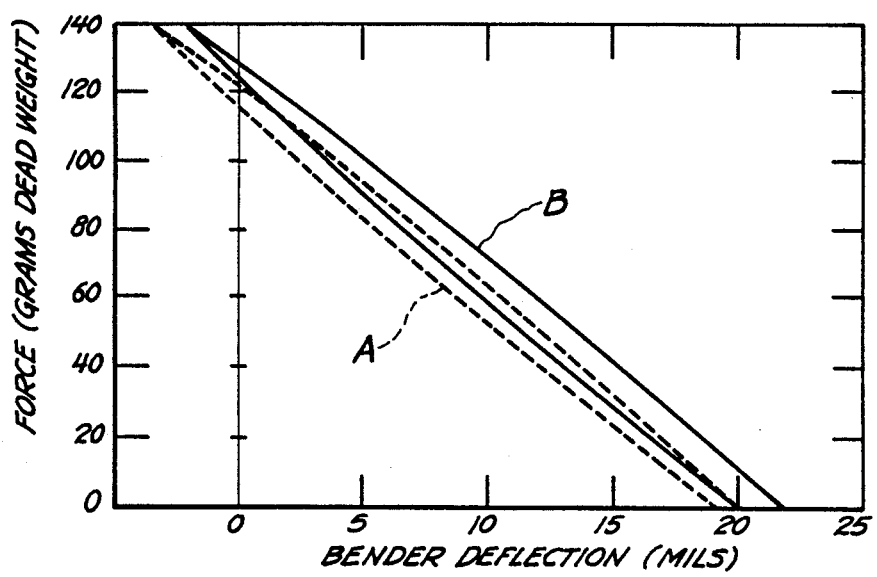
FIG. 5 is a graph depicting operational characteristics for one relay device depicted in FIGS. 4A, 4B and 4C.

For the above described piezoceramic relay embodiments to operate properly for a long time duration in a particular atmospheric cooling apparatus understandably further requires that the bender member itself continue to exhibit the needed operational characteristics. To further illustrate, it is expected that the relay contacts operating the refrigeration and defrost mechanism in a typical household refrigerator will be operated on the order of 500,000 cycles during its twenty year design lifetime. For such sustained operation a piezoceramic bender member requires that appropriate force and displacement characteristics be met while further resisting relay failure during operation due to arcing problems. Accordingly, actual fulfillment of these critical requirements for a typical piezoceramic bender member in the above defined apparatus embodiments will be further explained. A graph depicting the deflection and force characteristics for a commercially available bimorph type piezoceramic material having been obtained from Piezoelectric Products Inc. is given in FIG. 5. The reported values were obtained with the above described cantilever type bender member configuration described in FIG. 4A above and with the curve A results being for a non-stiffened member whereas the more effective curve B results were achieved when the free or movable bender end had been stiffened. More particularly, it is known that the bimorph member not only experiences bending in the longitudinal direction but that the free end also becomes concave in the direction perpendicular to the bend direction due to additional forces operating on the bimorph corners. If a contact is attached to the central portion of the bimorph free end, it will not be fully utilizing the generated force and travel available from the entire bimorph. It was thereby determined that the amount of force per unit in material could be optimized by applying a stiffening element to the free end of the bimorph member. A representative stiffening member was a piece of glass-filled Ultem plastic that had been slotted to slip over the free end of the bimorph member. It can be seen from the force-displacement curve provided that the characteristic hysteresis in the operation of the reported bimorph members is on the order of approximately ten percent. That is, the free deflection from rest to blocked force and back again results in approximately ten percent hysteresis in the deflection that occurs at the free deflection end of the curve. This known hysteresis characteristic must be taken into account in the proper design of a piezoceramic relay device. It can be further noted from the provided results that the stiffened bender member increases the average block force from 119 to 126 grams whereas the average free deflection has been likewise increased from approximately 19.5 mils to 21 mils. This results in a fourteen percent increase in the force-displacement product and therefore the work a given bimorph bender member can perform. Such increase in the force-displacement product attributable to stiffening the free end of the bimorph member further allows a significant reduction in the amount of piezoceramic material otherwise required for a given relay operation. For long term operation of this and other similar piezoceramic relay devices, such as described in FIGS. 4B and 4C above, it was found that stabilized operation further requires that the applied DC energizing potential be applied in the same direction as the poling direction in order to preclude a dimensional shift in the piezoceramic material. When the actuating voltage is applied in the opposite direction, gradual depoling occurs in the piezoceramic material. With time, a given displacement or force will gradually reduce to zero due to such depoling effect of the applied voltage. The rate of this depoling is dependent on the original poling conditions and the voltage applied. For high voltage applied potential, the depoling can occur over 1–2 minutes whereas lower voltages may only release the force over a period of years. For this reason, it becomes advisable to operate the piezoceramic relay with voltages applied to the bimorph plate elements in the poling direction and with only one of the ceramic plate elements of the bimorph being energized at the same time. Therefore, to bend the bimorph member upward, the top ceramic plate element can be energized with 300 volts while the bottom plate is electrically short-circuited. To bend the bimorph downward, the upper plate can be shorted and the bottom plate energized to the 300 volts.

It should be appreciated from the foregoing explanation that prepoling of the ceramic plate elements in a bimorph bender member forms dipoles in the individual ceramic crystals. Subsequently applying a DC energizing potential across a prepoled ceramic plate element produces a dipole alignment of the individual ceramic crystals with an accompanying dimensional change in the energized plate element. Under this voltage stress, the energized ceramic plate element becomes thicker in the polarity direction of the applied voltage while also becoming shorter in length. Application of such DC energizing potential to an unclamped bender member produce such dimensional change but without accompanying deflection of the bender member. As pointed out above, however, clamping a prepoled bimorph bender member at one end produces deflection at the opposite movable bender end when the ceramic plate elements are so energized. Applying the DC energizing potential across an individual prepoled ceramic plate element with the same polarity as the prepoling potential enhances the desired dipole alignment and with the accompanying dimensional changes caused in plate dimensions remaining stable over the passage of time. Such dipole enhancement thereby produces a stabilized deflection or force response so long as the prepoled bimorph piezoceramic relay device is operated with the unidirectional applied DC potential being in the same direction as the direction of the prepoling potential.

To ameliorate arcing problems for long term operation of the above described relay embodiment, further considerations apply. In the size suitable for use in this product application, there exist two major modes of undesirable contact welding. The first mode is due to low-contact force during periods of current conduction through the coacting contact pair. The constriction resistance of a closed contact pair is proportional to the inverse of the square root of the contact pressure. Therefore, insufficient contact force leads to a high constriction resistance, resulting in high localized temperatures at the point of physical contact closure. These high temperatures lead to localized microwelds of the contact pairs which the restoring force of the bimorph member would not be capable of breaking. The second mode of contact welding occurs in control arrangements where there is appreciable contact bounce on closure. If the contact pair bounces open after the load current is established, an arc strikes and is maintained by the line voltage and load impedance. This arc locally heats the contact pairs at the closure point. Each successive bounce reestablishes the arc and increases the contact temperature. In an extreme case with high inrush currents and multiple bounces, this localized heating can result in liquidified contact material at the arcing point, thereby causing a microweld of the contact pairs on final closures. This weld may be strong enough that it cannot be broken by the restoring force of the relay when it is de-energized. For piezoceramic relay devices, the opening force is limited to a value approximately equal to the contact closure force. To help alleviate both above described modes of contact welding it was found that forming the contacts with a low melting metal alloy, such as silver cadmium oxide, could maintain the coacting pairs of contacts for the present piezoceramic relay device in an operating condition. Reducing contact welding attributable to mechanical bounce when closing the coacting pairs of contacts can be achieved in a different manner. By operating the relay device circuitry in the present control arrangement so that bimorph capacitance is charged at a lower rate, a lower closing velocity of the contacts will be achieved thereby significantly reducing the undesirable bounce condition. Such drive circuitry modification can be achieved by adding a resistor in series with the AC power source while thereafter enabling the DC potential being applied across the individual piezoceramic plate elements to increase to the 300 volt operational level previously illustrated.

Figure 6:
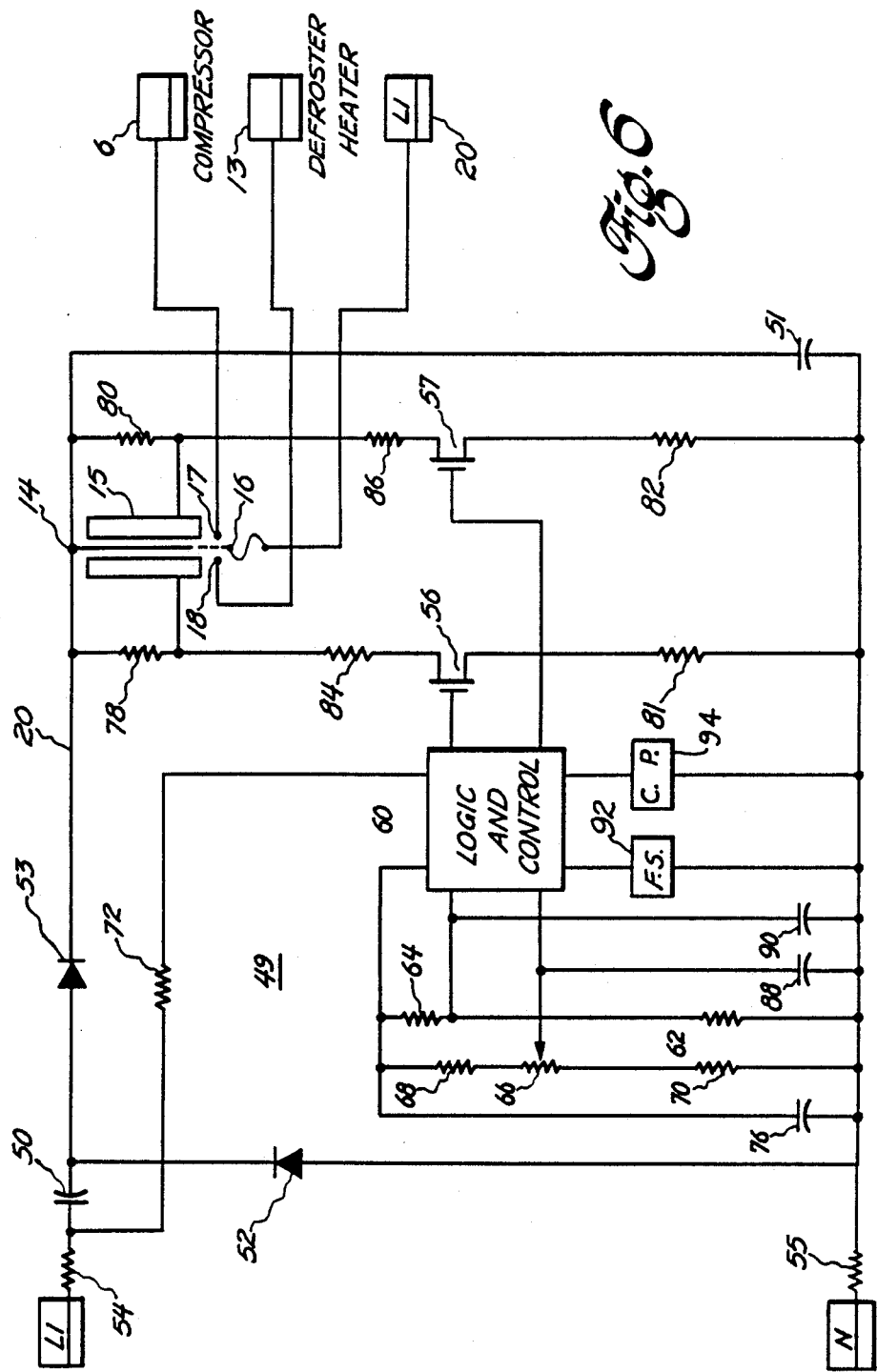
FIG. 6 is a circuit diagram for representative electronic control means in accordance with the present invention.

An electrical circuit diagram is provided in FIG. 6 for typical control means according to one aspect of the present invention as carried out in a fully automated manner. More particularly, the overall power control circuitry 49 that would be employed for a single control module 11 to automatically regulate the power input between the refrigeration and defrost mechanism in the above illustrated household refrigeration appliance is therein depicted. For ease of understanding, therefore, the same numerals are retained in FIG. 6 to identify the same circuit components previously identified in the preceding refrigeration control circuitry (FIG. 3). As can be noted in the present drawing, the piezoceramic bender member 15 is connected in circuit relationship so that its central conductive surface 14 is connected to one power conductor 20 with movable piezoceramic bender end 16 remaining in a central open position when the relay device is unenergized. Fixed electrical contacts 17 and 18 are connected in the circuitry which enable electrical connection to the refrigeration and defrost mechanism, all as also previously described. As can further be appreciated, the relay device interconnection provides a mechanical interlock such that the control means can never initiate simultaneous cooling and heating while the relay device requires very little holding power during its operation, such as about 10 microwatts. The depicted representative circuit means supplying DC energizing potential to the piezoceramic relay device simply consists of a diode-capacitor network as provided with a pump capacitor 50, storage capacitor 51 and doubling diodes 52 and 53 in order to effectively double the 115 volt AC supply in a known manner. Current limiting resistors 54 and 55 are included in the control circuitry to reduce suspectivility of the circuit to line-induced transients. The relay drive portion in the illustrated circuitry is completed with a pair of active devices 56 and 57 shown as discrete output transistors. Control signals enabling automated actuation of the piezoceramic relay device in the circuitry may be provided with a customized integrated circuit device 60 and with the control signals being derived in a general manner also previously explained. To still further explain a typical derivation of temperature control signals for the refrigeration mechanism herein being illustrated, however, there is utilized in the illustrated circuitry a feedback signal arrangement wherein solid state thermistor means 62 is connected with a series-limiting resistor 64 to provide bridge measurement with the user set point adjust potentiometer means 66 and two calibrating resistors 68 and 70 supplying the minimum and maximum temperature set points. The logic power supply in the control circuit means 60 is generated by dropping resistor 72 and energy storage capacitor 76. Such logic supply is further regulated by an on-chip shunt regulator further provided in the illustrated control circuit means. Energizing the piezoceramic relay device with simple single transistor drive means in the illustrated circuitry further employs passive resistor pullups 78 and 80 to discharge the piezoceramic plate elements whenever selective energization is terminated. On initial energization, the electronic control means will turn on to approximately 3 volts so that series connected active drive transistor 56 and resistor 81 operate as a controlled current source. On initial closure of the further connected relay contacts, the voltage being applied at the gate of active device 56 is thereupon immediately raised to the full logic bus voltage provided from the electronic control circuit means which may be as high as 10 volts. This then turns active device 56 full on and the piezoceramic relay plate element being so operated is thereupon rapidly charged, increasing the contact force of the relay contacts and preventing a weld upon further closure contact. Similar operation of the remaining active device 57 and its series connected resistor 82 is provided by the electronic control circuit means. Further current limiting resistors 84 and 86 series connected to active devices 56 and 57, respectively, prevent excess current in the active devices that turn on as well as participating in limiting the maximum rate of closure of the piezoceramic relay contacts. While the relay is being actuated by the illustrated control circuitry, the major current load on the power supply occurs through the shunt resistor means 78 and 80. This mode of operation limits the maximum voltage applied to the relay device due to loading by the resistor means of the high source impedance provided with the present diode-capacitor network. Erosion of the relay contacts is minimized in this mode of operation since a rather slow parting velocity of the relay contacts is thereby experienced. Remaining capacitor means 88 and 90 depicted in the illustrated circuitry primarily provide noise supression. Optional frost sensing means 92 and already known compressor protection means 94 have been further included in the illustrated control circuitry to demonstrate still other useful control functions which are readily programmable into the integrated circuit portion of the control circuitry employing conventional technology.

Overall automated operation of the above described control circuitry causes the piezoceramic bender member to deflect in a first direction with control signals provided by the associated integrated circuit means to complete a circuit between the AC power source and the terminal means connected to the refrigeration mechanism while causing the piezoceramic bender member to deflect in a second direction with second control signals provided by the integrated circuit means to complete a circuit between the AC power source and the defrost mechanism. In such automated method of operation the defrost mechanism can be operated for a predetermined time interval responsive to the second control signals with the operation of the defrost mechanism being initiated whenever a predetermined operating time interval of the refrigeration mechanism is exceeded according to a preprogrammed sequence provided to the integrated circuit. As previously explained, the defrost mechanism operation can be made further responsive with the second control signals to enable initiation of a defrost cycle following passage of a predetermined time interval subsequent to its preceding operation. With the frost sensing means being included in the control circuitry, it becomes further possible to conduct operation of the defrost mechanism responsive to second control signals being initiated responsive to the frost sensing means. In a similar manner, the illustrated integrated circuit can further provide thermal protection to the refrigeration mechanism with additional temperature sensing means being provided to the compressor motor. Representative control steps being carried out in accordance with a typical mode of operating the illustrated circuitry include initiating operation of the refrigeration mechanism at one predetermined temperature with the AC power being supplied when the electrical contacts of the movable piezoceramic relay device are moved to a first operating position, sensing temperatures achieved in the particular atmospheric cooling apparatus during operation of the refrigeration mechanism to derive first control signals representing the difference between the sensed temperature and a predetermined second lower temperature, the first control signals enabling a high voltage DC energizing potential of predetermined polarity to be applied to the piezoceramic relay device, applying the high voltage DC energizing potential to the piezoceramic relay device until the sensed temperature difference reaches zero, then terminating the high voltage DC energizing potential which causes the electrical contacts of the piezoceramic relay device to open, deriving second control signals whereby the time interval during which the defrost mechanism is operated is determined by the operating time interval of the refrigeration mechanism, the second control signals enabling a high voltage DC energizing potential of opposite polarity to be applied to the piezoceramic relay device, and applying the high voltage DC energizing potential of opposite polarity to the piezoceramic relay device which causes the electrical contacts of the piezoceramic relay device to move to a second operating position applying AC power to initiate operation of the defrost mechanism. As hereinbefore mentioned, the customizing of a typical high voltage integrated circuit to perform these control steps utilizes conventional technology. The customary microprocessor unit incorporated into the integrated circuit device performs the illustrated control functions in accordance with instructions provided in the Read Only Memory (ROM) unit operatively associated therewith. Accordingly, one having ordinary skill in the programming art can prepare a set of instructions for permanent storage in the ROM unit of the microprocessor and which enables the microprocessor thereafter to routinely execute the control program. The improved control algorithm according to one aspect of the present invention is thereby simply entered into these programming instructions.

A representative embodiment for the above illustrated refrigeration appliance employing such electronic control means to regulate AC power input between the refrigeration mechanism and defrost mechanism to avoid simultaneous operation of the respective mechanism can include (a) at least one piezoceramic relay device having first terminal means for connection to an AC power source, second terminal means enabling electrical connection of the AC power source to the refrigeration mechanism in one operating position, and third terminal means enabling electrical connection of the AC power source to the defrost mechanism in a second operating position, the relay device further including a movable piezoceramic bender member formed by at least two planar prepoled piezoceramic plate elements secured in opposed parallel relationship sandwich fashion on opposite sides of at least one central conductive surface and having outer conductive surfaces that are insulated from each other and the central surface by the respective intervening piezoceramic plate element thicknesses, the bender member further having a pair of movable electrical contacts disposed on opposite sides of the bender member to coact with a pair of fixed electrical contacts disposed thereby, the fixed electrical contacts being separately connected on one side to terminal means in the refrigeration mechanism while being connected on the remaining side to terminal means in the defrost mechanism and with the bender member being made to deflect either side of the center position normally assumed by the bender member in an unenergized position, (b) relay switching circuitry connected in circuit relationship across respective ones of the prepoled piezoceramic plate elements to provide DC energizing potential enabling selective deflection of the bender member responsive to control signals derived during operation of the refrigeration and defrost mechanisms, and (c) the relay switching circuitry directly and ohmically connected to the AC power source and terminal means of the piezoceramic relay device for deflection in a first position to complete a circuit between the AC power source and the terminal means of the refrigeration mechanism or to deflect in a second direction to complete a circuit between the AC power source and the terminal means of the defrost mechanism as controlled with further interconnected integrated circuit means. A suitable piezoceramic relay device operating in this manner, as described in FIG. 4A above, is preferably prepoled selectively with clamping means being secured at non-poled portions adjacent to and mechanically supporting the selectively prepoled bender member in a cantilever manner for operating the pairs of coacting electrical contacts, the non-poled portions being mechanically unstrained and electrically neutral. Typical relay switching circuitry employed in such manner includes a diode-capacitor network to develop the high voltage DC energizing potential and further includes series connected isolating resistor means to limit the current drawn from the AC power source. Also included in the representative relay switching circuitry are charging resistor means connected to conduct the energizing potential to the piezoceramic relay device along with first resistor means being provided to discharge the first piezoceramic plate element when energization thereof has been terminated and second resistor means being provided to discharge the second piezoceramic plate element when its energization has been terminated. One mode of operating the defrost mechanism according to the previously described control algorithm improvement initiates a defrost cycle responsive to control signals being provided by the interconnected integrated circuit means at a predetermined value of 9.5 hours in accordance with the further previously defined run interval value or whenever 48 hours have elapsed since the last defrost cycle. By operating the illustrated domestic appliance in this manner it will be evident that not only can a simpler control means now be installed with greater ease entirely within the apparatus and with lower wiring costs being required to do so but that its operation will cost less to a user.

The flow chart depicted in FIG. 7 represents a typical preprogrammed instruction for the above illustrated integrated circuit means to operate the controlled apparatus in a fully automated manner. The flow chart consists of a sequence of routines continuously recycled through the microprocessing unit while the control circuitry is continually energized by having the controlled apparatus connected to a power source. The overall control program is logically separated into several control routines. In the first routine labeled "$T/T_U$" and which controls operation of the refrigeration mechanism, the sensed temperature in the food compartments is compared with the maximum set temperature. If the sensed temperature exceeds the maximum set temperature, then a sub-routine for the compressor operating status is scanned. In the sub-routine the compressor will be turned on unless already operating and the electronic defrost timer started at the time such compressor operation is initiated. If the compressor is found operating, a second sub-routine labeled "$T_D/T_{DS}$ or $T_E/T_{ES}$" is scanned to determine if the defrost timer value exceeds the defrost start time value or whether an elapsed time value exceeds a predetermined maximum elapsed time value. If either excess is found in this sub-routine then the program recycles back to the initial starting point. If neither excess is found in the latter sub-routine, however, the program next proceeds to start the defrost heater as well as start the defrost heater timer. As can be further noted in the drawing, there are additional sub-routines followed by the control program when initiating operation of the defrost mechanism. The first sub-routine labeled "$T_H/T_{HF}$ or $T_S/T_{HOT}$" compares the defrost heater timer value with a predetermined maximum heater set point and further compares the operating temperature of the defrost heater with the maximum defrost heater set point. This sub-routine continues to be recycled so long as no excess values are detected. If either excess is detected in the sub-routine, however, then the defrost cycle is terminated and the defrost timer, the elapsed timer, and the heater timer reset at this time. The defrost timer is also restarted in the next sub-routine so that its restart time value can be compared with a predetermined delay time value in the next sub-routine labeled "$T_H/T_{HS}$". This final sub-routine in the defrost control program enables a delay period to be introduced before the compressor mechanism is actuated so that the refrigerant gas pressure can be equalized to avert starting the compressor motor with a high back pressure. Upon completing all the sub-routines associated with the operation of the defrost mechanism, the control program cycles back to its starting point. Continued cycling of the control program with respect to further operation of the refrigeration mechanism proceeds to a next scan routine labeled "$T_L/T/T_U$" wherein the sensed temperatures in the food compartment are compared with both the upper and lower temperature set points. This scanning routine is continued so long as the sensed temperatures remain within the established set points and during such monitoring a sub-routine is followed to maintain the compressor in its operating mode. The sub-routine either cycles the program back to the sub-routine followed in the preceding scan program with respect to operation of the refrigeration mechanism if the compressor is found to be still on or cycles the program to a subsequently followed scan routine if the compressor is found to be off. When the program for operation of the refrigeration mechanism finds the operating temperature in the food compartment not residing within the upper and lower established set points, a next scan routine is followed. In this scan routine, the operating condition of the compressor is established with the compressor being turned off at this time by a program sub-routine which also reverses the defrost timer. If the compressor is found off at this time, then the control program cycles to a final scan routine labeled "$T_E/T_S$". In this final scan routine, the elapsed timer value is compared with the maximum time value. When the elapsed timer value exceeds the maximum elapsed time value the control program cycles to the sub-routines initiating a defrost cycle. If the maximum elapsed time value exceeds the elapsed timer value in this routine the program simply cycles back to the starting point. It will be evident from a consideration of the flow chart that operating means are herein provided for automated regulation of the refrigeration and defrost mechanisms in a manner avoiding simultaneous operation of the respective mechanisms. Moreover, it will be further evident that such automated regulation of the power input between the respective mechanism is being carried out in a more efficient manner whereby operation of the defrost mechanism can be reduced in the controlled apparatus.

It will be apparent from the foregoing description that a broadly useful power regulation system has been disclosed which enables more efficient operation of an atmospheric cooling apparatus. It will also be apparent that modifications can be made in the specific methods, control means and controlled apparatus as herein disclosed without departing from the spirit and scope of the present invention. For example, it is recognized that still further control functions than above specifically disclosed can readily be programmed into the integrated circuit means being employed for extended control of the refrigeration and defrost mechanisms. Additionally, it is further contemplated that various modifications can be made with respect to the specific refrigeration mechanisms and defrost mechanisms above illustrated while still adhering to the same control concepts disclosed for the present invention. Consequently, it is intended to limit the present invention only by the scope of the appended claims.

What we claim as new and desire to secure by Letters Patent of the United States is:

1. In a system for regulating electrical power input in an atmospheric cooling apparatus having a refrigeration mechanism, the combination comprising:
   (a) a piezoceramic relay device connected in circuit relationship to enable connection of a power source to the refrigeration mechanism, the piezoceramic relay device including terminal means for connection to the power source and a movable piezoceramic bender member having movable electrical contact means which coact with fixed electrical contact means disposed thereby, the fixed electrical contact means being connected to terminal means of the refrigeration mechanism, and the piezoceramic bender member maintaining the movable contact means spaced apart from the fixed electrical contact means while in an unenergized condition; and (b) control circuitry directly and ohmically connected to the power source and the terminal means of the piezoceramic relay device which responds to control signals for actuation of the movable piezoceramic bender member and causes the bender member to deflect and complete a circuit between the power source and the terminal means of the refrigeration mechanism.

2. The power regulating system of claim 1 wherein the piezoceramic bender member is formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

3. The power regulating system of claim 1 wherein the piezoceramic bender member is polarized with clamping means being secured at non-poled portions adjacent to and mechanically supporting the bender member in a cantilever manner for operating the pair of coacting electrical contact means, the non-poled portions being mechanically unstrained and electrically neutral.

4. The power regulating system of claim 1 wherein the control circuitry further includes a diode-capacitor network for developing a high voltage DC energizing potential to operate the piezoceramic relay device.

5. The power regulating system of claim 4 wherein the DC energizing potential has the same polarity as the polarity of the potential used to initially polarize the piezoceramic bender member.

6. In a system for regulating electrical power input in an atmospheric cooling apparatus having a defrost mechanism, the combination comprising:

(a) a piezoceramic relay device connected in circuit relationship to enable connection of a power source to the defrost mechanism, the piezoceramic relay device including terminal means for connection to the power source and a movable piezoceramic bender member having movable contact means which coact with fixed electrical contact means disposed thereby, the fixed electrical contact means being connected to terminal means of the defrost mechanism, and the piezoceramic bender member maintaining the movable contact means spaced apart from the fixed electrical contact means while in an unenergized condition, and (b) control circuitry directly and ohmically connected to the power source and the terminal means of the piezoceramic relay device which responds to control signals for actuation of the movable piezoceramic bender member and causes the bender member to deflect and complete a circuit between the power source and the terminal means of the defrost mechanism.

7. The power regulating system of claim 6 wherein the piezoceramic bender member is formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

8. The power regulating system of claim 6 wherein the piezoceramic bender member is polarized with clamping means being secured at non-poled portions adjacent to and mechanically supporting the bender member in a cantilever manner for operating the pair of coacting electrical contact means, the non-poled portions being mechanically unstrained and electrically neutral.

9. The power regulating system of claim 6 wherein the time interval during which the defrost mechanism is operated responsive to the control signals is determined by the operating time interval of an operatively associated refrigeration mechanism.

10. The power regulating system of claim 6 wherein the defrost mechanism is operated responsive to the control signals for a predetermined time interval and with operation of the defrost mechanism being initiated whenever a predetermined operating time interval of an operatively associated refrigeration mechanism is exceeded.

11. The power regulating system of claim 6 wherein operation of the defrost mechanism responsive to the control signals is further initiated following passage of a predetermined time interval subsequent to its preceding operation.

12. The power regulating system of claim 6 wherein operation of the defrost mechanism responsive to control signals is further made responsive to frost sensing means.

13. The power regulating system of claim 9 wherein operation of the refrigeration mechanism responsive to the control signals is further made responsive to temperature sensing means.

14. A system for regulating electrical power input in an atmospheric cooling apparatus having a refrigeration mechanism comprising:

(a) at least one piezoceramic relay device connected in circuit relationship to enable individual connection of the power source to the refrigeration mechanism, the relay device including terminal means operatively associated with at least one movable piezoceramic bender member having coacting contact means for individual connection to terminal means provided in the refrigerator mechanism, and (b) control circuitry directly and ohmically connected to the power source and the terminal means of the piezoceramic relay device which responds to control signals for actuation of the movable piezoceramic bender member and causes the bender member to deflect and complete a circuit between the power source and the terminal means of the refrigeration mechanism.

15. The power regulating system of claim 14 wherein the piezoceramic bender member is formed by at least two planar piezoceramic plate elements secured in opposed parallel relationship sandwich fashion on opposite side of at least one central conductive surface and having outer conductive surfaces that are insulated from each other and the central conductive surface by the respective intervening piezoceramic plate element thicknesses.

16. The power regulating system of claim 14 wherein the piezoceramic bender member is polarized with clamping means being secured at non-poled portions adjacent to and mechanically supporting the bender member in a cantilever manner, the non-poled portions being mechanically unstrained and electrically neutral.

17. The power regulating system of claim 14 wherein the control circuitry further includes a diode-capacitor network for developing a high voltage DC energizing potential to operate the piezoceramic relay device.

18. The power regulating system of claim 17 wherein the DC energizing potential has the same polarity as the polarity of the potential used to initially polarize the piezoceramic bender member.

19. The power regulating system of claim 14 wherein the time interval during which the defrost mechanism is operated responsive to the control signals is determined by the operating time interval of the refrigeration mechanism.

20. The power regulating system of claim 14 wherein the defrost mechanism is operated responsive to the control signals for a predetermined time interval and with operation of the defrost mechanism being initiated whenever a predetermined operating time interval of the refrigeration mechanism is exceeded.

21. The power regulating system of claim 14 wherein operation of the defrost mechanism responsive to the control signals is further initiated following passage of a predetermined time interval subsequent to its preceding operation.

22. The power regulating system of claim 14 wherein operation of the defrost mechanism responsive to control signals is further made responsive to frost sensing means.

23. The power regulating system of claim 14 wherein operation of the refrigeration mechanism responsive to control signals is further made responsive to temperature sensing means.

24. A system for regulating electrical power input between the refrigeration mechanism and the defrost mechanism in an atmospheric cooling apparatus which avoids simultaneous operation of the respective mechanisms comprising:
  (a) a single piezoceramic relay device connected in circuit relationship to enable individual connection of the power source to either refrigeration or defrost mechanism, the piezoceramic relay device including terminal means for connection to the power source and a movable piezoceramic bender member having a pair of movable electrical contact means which coact with a pair of fixed electrical contact means disposed thereby, the pair of fixed electrical contact means being separately connected to terminal means of the refrigeration and defrost mechanisms, and
  (b) control circuitry directly and ohmically connected to the power source and the terminal means of the piezoceramic relay device which responds to control signals for actuation of the movable piezoceramic bender member and causes the bender member to deflect in a first direction and complete a circuit between the power source and the terminal means of the refrigeration mechanism or to deflect in a second direction to complete a circuit between the power source and the terminal means of the defrost mechanism.

25. The power regulating system of claim 24 wherein the piezoceramic bender member is formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thickness.

26. The power regulating system of claim 24 wherein the piezoceramic bender member is polarized with clamping means being secured at non-poled portions adjacent to and mechanically supporting the bender member in a cantilever manner for operating the pairs of coacting electrical contact means, the non-poled portions being mechanically unstrained and electrically neutral.

27. The power regulating system of claim 24 wherein the control circuitry further includes a diode-capacitor network for developing a high voltage DC energizing potential to operate the piezoceramic relay device.

28. The power regulating system of claim 27 wherein the DC energizing potential has the same polarity as the polarity of the potential used to initially polarize the piezoceramic bender member.

29. The power regulating system of claim 24 wherein the time interval during which the defrost mechanism is operated responsive to the control signals is determined by the operating time interval of the refrigeration mechanism.

30. The power regulating system of claim 24 wherein the defrost mechanism is operated responsive to the control signals for a predetermined time interval and with operation of the defrost mechanism being initiated whenever a predetermined operating time interval of the refrigeration mechanism is exceeded.

31. The power regulating system of claim 24 wherein operation of the defrost mechanism responsive to the control signals is further initiated following passage of a predetermined time interval subsequent to its preceding operation.

32. The power regulating system of claim 24 wherein operation of the defrost mechanism responsive to control signals is further made responsive to frost sensing means.

33. A system for regulating electrical power input between the refrigeration mechanism and the defrost mechanism in an atmospheric cooling apparatus comprising:
  (a) a single piezoceramic relay device connected in circuit relationship to enable individual connection of the power source to either refrigeration or defrost mechanism, the piezoceramic relay device having a bifurcated construction with a pair of movable piezoceramic bender elements connected by terminal means to the power source, each of the bender elements having movable electrical contact means which coact with fixed electrical contact means disposed thereby, the fixed electrical contact means being separately connected to terminal means of the refrigeration and defrost mechanisms, and with each of the, bender elements maintaining the movable contact means spaced apart from the fixed electrical contact means while in an unenergized condition, and
  (b) control circuitry directly and ohmically connected to the power source and the terminal means of the bifurcated piezoceramic relay device which responds to control signals for separate actuation of the individual bender elements and causes the bender elements to deflect and complete a circuit between the power source and the terminal means of the mechanism operatively associated with the actuated bender element.

34. The power regulating system of claim 33 wherein each piezoceramic bender element is formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

35. The power regulating system of claim 33 wherein each piezoceramic bender element is polarized with clamping means being secured at non-poled portions adjacent to and mechanically supporting the bender member in a cantilever manner for operating the pairs of coacting electrical contact means, the non-poled portions being mechanically unstrained and electrically neutral.

36. The power regulating system of claim 33 wherethe control circuitry further includes a diode-capacitor network for developing a high voltage DC energizing potential to operate the piezoceramic relay device.

37. The power regulating system of claim 36 wherein the DC energizing potential has the same polarity as the polarity of the potential used to initially polarize the piezoceramic bender member.

38. The power regulating system of claim 33 wherein the time interval during which the defrost mechanism is operated responsive to the control signals is determined by the operating time interval of the refrigeration mechanism.

39. The power regulating system of claim 33 wherein the defrost mechanism is operated responsive to the control signals for a predetermined time interval and with operation of the defrost mechanism being initiated whenever a predetermined operating time interval of the refrigeration mechanism is exceeded.

40. The power regulating system of claim 33 wherein operation of the defrost mechanism responsive to control signals is further initiated following passage of a predetermined time interval subsequent to its preceding operation.

41. The power regulating system of claim 33 wherein operation of the defrost mechanism responsive to control signals is further made responsive to frost sensing means.

42. A system for regulating electrical power input between the refrigeration mechanism and the defrost mechanism in an atmospheric cooling apparatus comprising:
(a) a pair of piezoceramic relay devices connected in circuit relationship to enable independent connection of the power source to an individual mechanism, one of the piezoceramic relay devices including terminal means for connection to the power source and a movable piezoceramic bender member having movable electrical contact means which coact with fixed electrical contact means disposed thereby to connect with terminal means of the refrigeration mechanism, with the remaining piezoceramic relay device including terminal means for connection to the power source and a movable piezoceramic bender member having movable electrical contact means which coact with fixed electrical contact means disposed thereby to connect with terminal means of the defrost mechanism, and (b) control circuitry directly and ohmically connected to the power source and the terminal means of both piezoceramic relay devices which respond to control signals for separate actuation of the individual bender members and cause the bender members to deflect and complete a circuit between the power source and the terminal means of the mechanism operatively associated with the actuated bender member.

43. The power regulating system of claim 42 wherein the piezoceramic bender members are formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

44. The power regulating system of claim 42 wherein the piezoceramic bender members are polarized with clamping means being secured at non-poled portions adjacent to and mechanically supporting the bender member in a cantilever manner for operating the pair of coacting electrical contact means, the non-poled portions being mechanically unstrained and electrically neutral.

45. The power regulating system of claim 42 wherein the control circuitry further includes a diode-capacitor network for developing a high voltage DC energizing potential to operate the piezoceramic relay devices.

46. The power regulating system of claim 45 wherein the DC energizing potential has the same polarity as the polarity of the potential used to initially polarize the piezoceramic bender members.

47. The power regulating system of claim 42 wherein the time interval during which the defrost mechanism is operated responsive to the control signals is determined by the operating time interval of the refrigeration mechanism.

48. The power regulating system of claim 42 wherein the defrost mechanism is operated responsive to control signals for a predetermined time interval and with operation of the defrost mechanism being initiated whenever a predetermined operating time interval of the refrigeration mechanism is exceeded.

49. The power regulating system of claim 42 wherein operation of the defrost mechanism responsive to the control signals is further initiated following passage of a predetermined time interval subsequent to its preceding operation.

50. The power regulating system of claim 42 wherein operation of the defrost mechanism responsive to control signals is further made responsive to frost sensing means.

51. A system for electronically regulating AC power input between the refrigeration mechanism and the defrost mechanism in an atmospheric cooling apparatus which avoids simultaneous operation of the respective mechanisms comprising:
(a) at least one piezoceramic relay device having first terminal means for connection to an AC power source, second terminal means enabling electrical connection of the AC power source to the refrigeration mechanism in one operating position, and third terminal means enabling electrical connection of the AC power source to the defrost mechanism in a second operating position, the relay device further including a movable piezoceramic bender member formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses, the bender member further having a pair of movable electrical contacts disposed on opposite sides of the bender member to coact with a pair of fixed electrical contact disposed thereby, one of the fixed electrical contacts being separately connected to terminal means in the refrigeration mechanism while the remaining fixed electrical contact being connected to the terminal means in the defrost mechanism, and with the bender member being made to deflect either side of a center position normally assumed by the bender member in an unenergized position, (b) control circuitry connected in circuit relationship across respective ones of the piezoceramic plate elements to provide DC energization potential enabling selective deflection of the bender member responsive to control signals derived during operation of the refrigeration and defrost mechanisms, and (c) control circuitry being directly and ohmically connected to the AC power source and the terminal means of the piezoceramic relay device for deflection in a first direction to complete a circuit between the AC power source and the terminal means of the refrigeration mechanism or to deflect in a second direction to complete a circuit between the AC power source and the terminal means of the defrost mechanism as controlled with further interconnected integrated circuit means.

52. The power regulating system of claim 51 wherein the piezoceramic relay device is polarized with clamping means being secured at non-poled portions adjacent to and mechanically supporting the bender member in a cantilever manner for operating the pairs of coacting electrical contact means, the non-poled portions being mechanically unstrained and electrically neutral.

53. The power regulating system of claim 51 wherein the control circuitry includes a diode-capacitor network to develop a high voltage DC energizing potential.

54. The power regulating system of claim 51 wherein the time interval during which the defrost mechanism is operated responsive to the control signals is determined by the operating time interval of the refrigeration mechanism.

55. The power regulating system of claim 51 wherein the defrost mechanism is operated responsive to the control signals for a predetermined time interval and with operation of the defrost mechanism being initiated whenever a predetermined operating time interval of the refrigeration mechanism is exceeded.

56. The power regulating system of claim 51 wherein operation of the defrost mechanism responsive to the control signals is further initiated following passage of a predetermined time interval subsequent to its preceding operation.

57. The power regulating system of claim 51 wherein operation of the defrost mechanism responsive to the control signals is further made responsive to frost sensing means.

58. The power regulating system of claim 51 wherein operation of the refrigeration mechanism responsive to the control signals is further made responsive to temperature sensing means.

59. A system for electronically regulating AC power input between the refrigeration mechanism and the defrost mechanism in an atmospheric cooling apparatus which avoids simultaneous operation of the respective mechanisms comprising:

(a) temperature sensing means for sensing the temperature achieved in the atmospheric cooling apparatus during operation of the refrigeration mechanism, (b) at least one piezoceramic relay device having first terminal means for connection to an AC power source, second terminal means enabling electrical connection of the AC power source to the refrigeration mechanism in one operating position, and third terminal means enabling electrical connection of the AC power source to the defrost mechanism in a second operating position, the relay device further including a movable piezoceramic bender member formed by a least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses, the bender member further having a pair of movable electrical contacts disposed on opposite sides of the bender member to coact with a pair of fixed electrical contacts disposed thereby, one of the fixed electrical contacts being separately connected to terminal means in the refrigeration mechanism while the remaining fixed electrical contact being connected to terminal means in the defrost mechanism, and with the bender member being made to deflect for completion of a circuit either side of a center position normally assumed by the bender member in an unenergized position, (c) control circuitry connected in circuit relationship across respective ones of the piezoceramic plate elements to provide DC energization potential having the same polarity as the polarity of the potential used to initially polarize the piezoceramic, said plate elements being responsive to control signals derived during operation of the refrigeration and defrost mechanisms, and thereby causing such selective completion of a circuit by the piezoceramic relay device, (d) the control circuitry including a voltage conversion circuit for direct ohmic connection to a source of AC voltage and connected to the bender member, the voltage conversion circuit having a diode-capacitor network for developing a high DC supply voltage, a semiconductor circuit connected with the voltage conversion circuit which includes first and second high voltage active devices connected to actuate the bender member, and an integrated control circuit responsive to the temperature sensing means which provides the control signals to the active devices, and (e) the integrated control circuit further providing for operation of the refrigeration and defrost mechanisms such that the time interval during which the defrost mechanism is operated is determined by the operating time interval of the refrigeration mechanism.

60. The power regulating system of claim 59 wherein the defrost mechanism is operated for a predetermined time interval and with operation of the defrost mechanism being initiated whenever a predetermined operating time interval of the refrigeration mechanism is exceeded.

61. The power regulating system of claim 59 wherein operation of the defrost mechanism is further initiated following passage of a predetermined time interval subsequent to its preceding operation.

62. The power regulating system of claim 59 wherein operation of the defrost mechanism is further initiated responsive to frost sensing means.

63. The power regulating system of claim 59 wherein the temperature achieved by the refrigeration mechanism is controlled with an error signal which is the function of the difference between the sensed temperature and a predetermined temperature setting.

64. The power regulating system of claim 63 wherein operation of the refrigeration mechanism is initiated at one predetermined temperature and terminated at a second lower temperature.

65. The power regulating system of claim 59 wherein the defrost mechanism is also subject to temperature control.

66. The power regulating system of claim 59 wherein the temperature signals being provided to the integrated control circuitry further provide thermal protection to the refrigeration mechanism.

67. The power regulating system of claim 59 wherein initiation of the refrigeration mechanism is delayed for a predetermined time interval following termination of the defrost mechanism operation.

68. A system for electronically regulating AC power input to a refrigeration apparatus comprising:
(a) a cabinet having at least one storage compartment,
(b) electrical refrigerating means including compressor means and evaporator means for cooling the storage compartment,
(c) electrical heating means to defrost the evaporator,
(d) temperature sensing means to actuate the compressor means at one predetermined temperature and to terminate compressor operation at a second lower temperature,
(e) at least one piezoceramic relay device having first terminal means for connection to an AC power source, second terminal means enabling electrical connection of the AC power source to the compressor means in one operating position, and third terminal means enabling electrical connection of the AC power source to the electrical heating means in a second operating position, the relay device further including a movable piezoceramic bender member formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses, and with the bender member further being electrically interconnected to deflect either side of a center position normally assumed by the bender member in an unenergized position for selective completion of a circuit providing AC power input either to the compressor means or to the electrical heating means which avoids simultaneous operation of the compressor and electrical heating means,
(f) control circuitry being connected in circuit relationship across respective ones of the piezoceramic plate elements to provide DC energization potential having the same polarity as the polarity of the potential used to initially polarize the piezoceramic plate elements, said plate elements being responsive to control signals derived by temperature feedback control in association with predetermined time intervals,
(g) the control circuitry including a voltage conversion circuit for direct ohmic connection to the AC power source and having a diode-capacitor network for developing a high DC supply voltage, a semiconductor circuit connected with the voltage conversion circuit which includes first and second high voltage active devices connected to actuate the bender member, and an integrated digital control circuit which provides the control signals to both active devices, and
(h) the integrated digital control circuit deriving the control signals by feedback temperature control wherein an error signal is generated which is a function of the difference between the sensed temperature and a predetermined temperature setting and with further control signals providing for cooperative action between the electrical refrigerating and heating means such that the time interval during which the heating means is operated is determined by the operating time interval of the refrigerating means.

69. The power regulating system of claim 68 wherein the heating means is operated for a predetermined time interval and with the heating means being initiated whenever a predetermined operating time interval of the refrigerating means is exceeded.

70. The power regulating system of claim 68 wherein operation of the heating means is further initiated following passage of a predetermined time interval subsequent to its preceding operation.

71. The power regulating system of claim 68 wherein operation of the heating means is further initiated responsive to frost sensing means associated with the evaporator.

72. The power regulating system of claim 68 wherein the bender member further includes movable electrical contacts disposed on opposite sides of the bender member to coact with fixed electrical contacts disposed thereby.

73. The power regulating system of claim 68 wherein the bender member is polarized with clamping means being secured at non-poled portions of the piezoceramic plate elements adjacent to and mechanically supporting the bender member in a cantilever manner for opening and closing both sets of coacting electrical contacts, the non-poled portions being mechanically unstrained and electrically neutral.

74. The power regulating system of claim 68 wherein the heating means is also subject to feedback temperature control.

75. The power regulating system of claim 68 wherein the control signals further provide thermal protection to the compressor means.

76. The power regulating system of claim 68 wherein initiation of the compressor operation is delayed for a predetermined time interval following termination of the heating means.

77. An atmospheric cooling apparatus comprising in combination a cabinet having at least one storage compartment, a refrigeration mechanism, and electrical control means to enable connection of a power source to the refrigeration mechanism, the electrical control means including:
(a) a piezoceramic relay device connected in circuit relationship to enable connection of the power source to the refrigeration mechanism, the relay device including terminal means for connection to the power source and a movable piezoceramic bender member having movable electrical contact means which coact with fixed electrical contact means disposed thereby, the fixed electrical contact means being connected to terminal means of the refrigeration mechanism, and the piezoceramic bender member maintaining the movable electrical contact means spaced apart from the fixed electrical contact means while in an unenergized condition, and
(b) control circuitry directly and ohmically connected to the power source and the terminal means of the piezoceramic relay device which responds to control signals for actuation of the movable piezoceramic bender member and causes the bender member to deflect and complete a circuit between the power source and the terminal means of the refrigeration mechanism.

78. The atmospheric cooling apparatus of claim 77 wherein the piezoceramic bender member is formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

79. The atmospheric cooling apparatus of claim 77 wherein the piezoceramic bender member is polarized with clamping means being secured at non-poled portions adjacent to and mechanically supporting the bender member in a cantilever manner, the non-poled portions being mechanically unstrained and electrically neutral.

80. The atmospheric cooling apparatus of claim 77 wherein the control circuit further includes a diode-capacitor network for developing a high voltage DC energizing potential to operate the piezoceramic relay device.

81. The atmospheric cooling apparatus of claim 80 wherein the DC energizing potential has the same polarity as the polarity of the potential used to initially polarize the piezoceramic bender member.

82. The atmosphere cooling apparatus of claim 77 wherein operation of the refrigeration mechanism responsive to the control signals is further made responsive to temperature sensing means.

83. An atmospheric cooling apparatus comprising in combination a cabinet having at least one storage compartment, a defrost mechanism, and electrical control means to enable connection of a power source to the defrost mechanism, the electrical control means including:
(a) a piezoceramic relay device connected in circuit relationship to enable connection of the power source to the defrost mechanism, the piezoceramic relay device including terminal means for connection to the power source and a movable piezoceramic bender member having movable electrical contact means which coact with fixed electrical contact means disposed thereby, the fixed electrical contact means being connected to terminal means of the defrost mechanism, and with the bender member maintaining the movable electrical contact means spaced apart from the fixed electrical contact means while in an unenergized condition, and
(b) control circuitry directly and ohmically connected to the power source and the terminal means of the piezoceramic relay device which responds to control signals for actuation of the movable piezoceramic bender member and causes the bender member to deflect and complete a circuit between the power source and the terminal means of the defrost mechanism.

84. The atmospheric cooling apparatus of claim 83 wherein the piezoceramic bender member is formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses.

85. The atmospheric cooling apparatus of claim 83 wherein the piezoceramic bender member is polarized with clamping means being secured at non-poled portions adjacent to and mechanically supporting the bender member in a cantilever manner for operating the pairs of coacting electrical contact means, the non-poled portions being mechanically unstrained and electrically neutral.

86. The atmospheric cooling apparatus of claim 83 wherein the control circuitry further includes a diode-capacitor network for developing a high voltage DC energizing potential to operate the piezoceramic relay device.

87. The atmospheric cooling apparatus of claim 86 wherein the DC energizing potential has the same polarity as the polarity of the potential used to initially polarize the piezoceramic bender member.

88. The atmospheric cooling apparatus of claim 83 wherein the time interval during which the defrost mechanism is operated responsive to control signals is determined by the operating time interval of the refrigeration mechanism.

89. The atmospheric cooling apparatus of claim 83 wherein the defrost mechanism is operated responsive to the control signals for a predetermined time interval and with operation of the defrost mechanism being initiated whenever a predetermined operating time interval of the refrigeration mechanism is exceeded.

90. The atmospheric cooling apparatus of claim 83 wherein operation of the defrost mechanism responsive to the control signals is further initiated following passage of a predetermined time interval subsequent to its preceding operation.

91. The atmospheric cooling apparatus of claim 83 wherein the operation of the defrost mechanism responsive to the control signals is further made responsive to frost sensing means.

92. The atmospheric cooling apparatus of claim 83 wherein operation of the refrigeration mechanism responsive to the control signals is further made responsive to temperature sensing means.

93. A refrigerating apparatus comprising in combination a cabinet having at least one storage compartment, a refrigeration mechanism, a defrost mechanism, and electrical control means for automatically regulating AC power input between the refrigeration mechanism and the defrost mechanism:

(a) a single piezoceramic relay device connected in circuit relationship to enable individual connection of the power source to either refrigeration or defrost mechanism, the piezoceramic relay device having a bifurcated construction with a pair of movable piezoceramic bender elements connected by terminal means to the power source, each of the bender elements having movable electrical contact means which coact with fixed electrical contact means disposed thereby, the fixed electrical contact means being separately connected to terminal means of the refrigeration and defrost mechanism, and with each of the bender elements maintaining the movable contact means spaced apart from the fixed electrical contact means while in an unenergized condition, and (b) control circuitry directly and ohmically connected to the power source and terminal means of the bifurcated piezoceramic relay device which responds to control signals for separate actuation of the individual bender elements and causes the bender elements to deflect and complete a circuit between the power source and the terminal means of the mechanism operatively associated with the actuated bender element.

94. The refrigerating apparatus of claim 93 wherein each piezoceramic bender element is formed by at least two planar piezoceramic plate elements secured in opposed parallel relationship sandwich fashion on opposite sides of at least one central conductive surface and having outer conductive surfaces that are insulated from each other and the central conductive surface by the respective intervening plate element thicknesses.

95. The refrigerating apparatus of claim 93 wherein each piezoceramic bender member is polarized with clamping means being secured at non-poled portions adjacent to and mechanically supporting the bender member in a cantilever manner, the non-poled portions being mechanically unstrained and electrically neutral.

96. The refrigerating apparatus of claim 93 wherein the control circuitry further includes a diode-capacitor network for developing a high voltage DC energizing potential to operate the piezoceramic relay device.

97. The refrigerating apparatus of claim 96 wherein the DC energizing potential has the same polarity as the polarity of the potential used to initially polarize the piezoceramic bender elements.

98. The refrigerating apparatus of claim 93 wherein the time interval during which the defrost mechanism is operated responsive to control signals is determined by the operating time interval of the refrigeration mechanism.

99. The refrigerating apparatus of claim 93 wherein the defrost mechanism is operated responsive to the control signals for a predetermined operating time interval and with operation of the defrost mechanism being initiated whenever a predetermined operating time interval of the refrigeration mechanism is exceeded.

100. The refrigerating apparatus of claim 93 wherein operation of the defrost mechanism responsive to the control signals is further initiated following passage of a predetermined time interval subsequent to its preceding operation.

101. The refrigerating apparatus of claim 93 wherein operation of the defrost mechanism responsive to the control signals is further made responsive to frost sensing means.

102. The refrigerating apparatus of claim 93 wherein operation of the refrigeration mechanism responsive to the control signals is further made responsive to temperature sensing means.

103. A refrigeration apparatus comprising in combination a cabinet having at least one storage compartment, a refrigeration mechanism, a defrost mechanism, and electrical control means for automatically regulating AC power input between the refrigeration and the defrost mechanism, the electrical control means including:

(a) a pair of piezoceramic relay devices connected in circuit relationship to enable individual connection of the power source to an individual mechanism, one of the piezoceramic relay devices including terminal means for connection to the power source and a movable piezoceramic bender member having movable electrical contact means which coact with fixed electrical contact means disposed thereby to connect with terminal means of the refrigeration mechanism, with the remaining piezoceramic relay device including terminal means for connection to the power source and a movable piezoceramic bender member having movable electrical contact means which coact with fixed electrical contact means disposed thereby to connect with terminal means of the defrost mechanism, and (b) control circuitry directly and ohmically connected to the power source and the terminal means of both piezoceramic relay devices which responds to control signals for separate actuation of the individual bender member and cause the bender member to deflect and complete a circuit between the power source and the terminal means of the mechanism operatively associated with the actuated bender member.

104. The refrigerating apparatus of claim 103 wherein the piezoceramic bender members are polarized with clamping means being secured at non-poled portions adjacent to and mechanically supporting the bender members in a cantilever manner for operating the pairs of coacting electrical contact means, the non-poled portions being mechanically unstrained and electrically neutral.

105. The refrigerating apparatus of claim 103 wherein the control circuitry further includes a diode-capacitor network for developing a high voltage DC energizing potential to operate the piezoceramic relay device.

106. The refrigerating apparatus of claim 105 wherein the DC energizing potential has the same polarity as the polarity of the potential used to initially polarize the piezoceramic bender members.

107. The refrigerating apparatus of claim 103 wherein the time interval during which the defrost mechanism is operated responsive to control signals is determined by the operating time interval of the refrigeration mechanism.

108. The refrigerating apparatus of claim 103 wherein the defrost mechanism is operated responsive to the control signals for a predetermined operating time interval and with operation of the defrost mechanism being initiated whenever a predetermined operating time interval of the refrigeration mechanism is exceeded.

109. The refrigerating apparatus of claim 103 wherein operation of the defrost mechanism responsive to the control signals is further initiated following passage of a predetermined time interval subsequent to its preceding operation.

110. The refrigerating apparatus of claim 103 wherein operation of the defrost mechanism responsive to the control signals is further made responsive to frost sensing means.

111. The refrigerating apparatus of claim 103 wherein operation of the refrigeration mechanism responsive to the control signals is further made responsive to temperature sensing means.

112. A refrigerating apparatus comprising in combination a cabinet having at least one storage compartment, a refrigeration mechanism, a defrost mechanism, and electronic control means for automatically regulating AC power input between the refrigeration mechanism and the defrost mechanism to avoid simultaneous operation of the respective mechanisms, the electronic control means including:

(a) at least one piezoceramic relay device having first terminal means for connection to an AC power source, second terminal means enabling electrical connection of the AC power source to the refrigeration mechanism in one operating position, and third terminal means enabling electrical connection of the AC power source to the defrost mechanism in a second operating position, the relay device further including a movable piezoceramic bender member formed by at least two planar piezoceramic plate elements secured in opposed parallel relationship sandwich fashion on opposite sides of at least one central conductive surface and having outer conductive surfaces that are insulated from each other and the central conductive surface by the respective intervening piezoceramic plate element thicknesses, the bender member further having a pair of movable electrical contacts disposed on opposite sides of the bender member to coact with a pair of fixed electrical contacts disposed thereby, one of the fixed electrical contacts being separately connected to terminal means in the refrigeration mechanism while the remaining electrical contact being connected to terminal means in the defrost mechanism and with the bender member being made to deflect either side of a center position normally assumed by the bender member in an unenergized position, (b) control circuitry connected in circuit relationship across respective ones of the piezoceramic plate elements to provide DC energizing potential enabling selective deflection of the bender member responsive to automated control signals derived during operation of the refrigeration and defrost mechanisms, and (c) the control circuitry being directly and ohmically connected to the AC power source and terminal means of the piezoceramic relay device for deflection in a first direction to complete a circuit between the AC power source and the terminal means of the refrigeration mechanism or to deflect in a second direction to complete a circuit between the AC power source and the terminal means of the defrost mechanism as controlled with further interconnected preprogrammed integrated circuit means.

113. The refrigerating apparatus of claim 112 wherein the piezoceramic relay device is polarized with clamping means being secured at non-poled portions adjacent to and mechanically supporting the bender member in a cantilever manner for operating the pairs of coacting electrical contacts, the non-poled portions being mechanically unstrained and electrically neutral.

114. The refrigerating apparatus of claim 112 wherein the control circuitry includes a diode-capacitor network to develop the high voltage DC energizing potential.

115. The refrigerating apparatus of claim 112 wherein the time interval during which the defrost mechanism is operated responsive to the control signals is determined by the operating time interval of the refrigeration mechanism.

116. The refrigerating apparatus of claim 112 wherein the defrost mechanism is operated responsive to control signals for a predetermined time interval and with operation of the defrost mechanism being initiated whenever a predetermined operating time interval of the refrigeration mechanism is exceeded.

117. The refrigerating apparatus of claim 112 wherein operation of the defrost mechanism responsive to the control signals is further initiated following passage of a predetermined time interval subsequent to its preceding operation.

118. The refrigerating apparatus of claim 112 wherein operation of the defrost mechanism responsive to the control signals is further made responsive to frost sensing means.

119. The refrigerating apparatus of claim 112 wherein operation of the refrigeration mechanism responsive to the control signals is further made responsive to temperature sensing means.

120. A household refrigerator comprising in combination a cabinet including a freezer storage compartment and a fresh food storage compartment, an electrical refrigeration mechanism including a compressor and evaporator for cooling both compartments by air circulation, an electrical heating mechanism to defrost the evaporator, temperature sensing means to actuate the compressor at one predetermined temperature and to terminate compressor operation at a second lower temperature, user operable temperature selector means to select a desired temperature in the fresh food compartment, and electronic control means responsive to the temperature sensing means and user operable temperature selection means for switching AC household power input automatically between the compressor and electrical heating means with a pair of piezoceramic relay devices:

(a) the piezoceramic relay devices being connected in circuit relationship to enable individual connection of the power source to an individual mechanism, one of the piezoceramic relay devices including terminal means for connection to the AC power source and a movable piezoceramic bender member having movable electrical contact means which coact with fixed electrical contact means disposed thereby to connect with terminal means of one mechanism, with the remaining piezoceramic relay device including terminal means for connecting the AC power source and a movable piezoceramic bender member having movable electrical contact means which coact with fixed electrical contact means disposed thereby to connect with terminal means of the remaining mechanism, and (b) the electronic control means comprising switching circuitry directly and ohmically connected to the AC power source and the terminal means of both piezoceramic relay devices which responds to control signals for separate actuation of the individual bender members and cause the bender members to deflect and complete a circuit between the power source and the terminal means of the mechanism operatively associated with the actuated bender member, the power switching circuitry including a voltage conversion circuit with a diode-capacitor network for developing a high DC supply voltage, a semiconductor circuit connected with the voltage conversion circuit which includes first and second high voltage active devices connected to actuate the bender members, and a programmed integrated digital circuit providing the control signals to the active devices, the control signals being automatically derived by temperature feedback control wherein an error signal is generated which is a function of the difference between the sensed temperature and a predetermined temperature setting and with further control signals providing for cooperative action between the compressor and electrical heating mechanisms such that the time interval during which the heating mechanism is operated is determined by the operating time interval of the compressor.

121. The refrigerator of claim 120 wherein the heating mechanism is operated for a predetermined time interval and with the heating mechanism being initiated whenever a predetermined operating time interval of the compressor is exceeded.

122. The refrigerator of claim 120 wherein operation of the heating mechanism is further initiated following passage of a predetermined time interval subsequent to its preceding operation.

123. The refrigerator of claim 120 wherein the heating mechanism is further initiated responsive to frost sensing means.

124. The refrigerator of claim 120 wherein the bender members are polarized with clamping means being secured at non-poled portions of the piezoceramic plate elements adjacent to and mechanically supporting the bender members in a cantilever manner for opening and closing both sets of coacting electrical contacts, the non-poled portions of the piezoceramic plate elements being mechanically unstrained and electrically neutral.

125. The refrigerator of claim 120 wherein the control signals further provide thermal protection to the compressor.

126. The refrigerator of claim 120 wherein initiation of the compressor operation is delayed for a predetermined time interval following termination of the heating mechanism, 127. A method for regulating power input in an atmospheric cooling apparatus having a refrigeration mechanism comprising the steps of:
(a) selecting a piezoceramic relay device having terminal means connected to the power source and a movable piezoceramic bender member with movable electrical contact means which coact with fixed electrical contact means disposed thereby, the fixed electrical contact means being connected to terminal means of the refrigeration mechanism, (b) causing the bender member to deflect in one direction with first control signals provided by associated control circuitry so that engagement of the coacting contact means occurs to complete a circuit between the power source and the terminal means of the refrigeration mechanism, and (c) providing second control signals with the associated control circuitry which causes the bender member to deflect in the opposite direction for disengagement of the coacting contact means.

128. The method of claim 127 wherein the control signals are derived with temperature sensing means.

129. The method of claim 128 wherein the control signals represent the difference between the sensed temperature and a predetermined second lower temperature.

130. The method of claim 127 wherein the control signals further provide thermal protection to the refrigeration mechanism.

131. The method of claim 127 wherein the control signals are derived automatically in the associated control circuitry with preprogrammed integrated circuit means.

132. A method for regulating power input in an atmospheric cooling apparatus having a defrost mechanism comprising the steps of:
(a) selecting a piezoceramic relay device having terminal means connected to the power source and a movable piezoceramic bender member with movable electrical contact means which coact with fixed electrical contact means disposed thereby, the fixed electrical contact means being connected to terminal means of the defrost mechanism, (b) causing the bender member to deflect in one direction with first control signals provided by associated control circuitry so that engagement of the coacting contact means occurs to complete a circuit between the power source and the terminal means of the defrost mechanism, and (c) providing second control signals with the associated control circuitry which causes the bender member to deflect in the opposite direction for disengagement of the coacting contact means.

133. The method of claim 132 wherein the defrost mechanism is operated for a predetermined time interval.

134. The method of claim 132 wherein operation of the defrost mechanism is initiated following passage of a predetermined time interval subsequent to its preceding operation.

135. The method of claim 132 wherein operation of the defrost mechanism is made responsive to frost sensing means.

136. A method for regulating electrical power input between the refrigeration mechanism and the defrost mechanism in an atmospheric cooling apparatus employing a movable piezoceramic relay as the switching means to avoid simultaneous operation of the respective mechanisms comprising the steps of:
(a) selecting a piezoceramic relay device having a movable piezoceramic bender member which operates either side of a center position normally assumed by the bender member in an unenergized condition, the piezoceramic relay device further having first terminal means for connection to the power source, second terminal means enabling connection of the power source to the refrigeration mechanism in a first operating position, and third terminal means enabling connection of the power source to the defrost mechanism in a second operating position, (b) causing the bender member to deflect in a first direction with first control signals provided by associated control circuitry to complete a circuit between the power source and the terminal means connected to the refrigeration mechanism, and (c) causing the bender member to deflect in a second direction with second control signals provided by the associated switching circuitry to complete a circuit between the power source and the defrost mechanism.

137. The method of claim 136 wherein the defrost mechanism is operated for a predetermined time interval responsive to the second control signals and with operation of the defrost mechanism being initiated whenever a predetermined operating time interval of the refrigeration mechanism is exceeded.

138. The method of claim 136 wherein operation of the defrost mechanism responsive to the second control signals is further initiated following passage of a predetermined time interval subsequent to its preceding operation.

139. The method of claim 136 wherein operation of the defrost mechanism responsive to the second control signals is further initiated responsive to frost sensing means.

140. The method of claim 136 wherein the first control signals further provide thermal protection to the refrigeration mechanism.

141. The method of claim 136 wherein initiation of the refrigeration mechanism responsive to the first control signals is delayed for a predetermined time interval following termination of the defrost mechanism.

142. A method for regulating electrical power input between the refrigeration mechanism and the defrost mechanism in an atmospheric cooling apparatus employing a movable piezoceramic relay device as the switching means comprising the steps of:

(a) selecting a single piezoceramic relay device connected in circuit reltionship to enable individual connection of the power source to either refrigeration or defrost mechanisms, the piezoceramic relay device having a bifurcated construction with a pair of movable piezoceramic bender elements connected by terminal means to the power source, each of the bender elements having a movable electrical contact means which coact with fixed electrical contact means disposed thereby, the fixed electrical contact means being separately connected to terminal means of the refrigeration and defrost mechanisms, (b) causing the bender element having terminal means connected to the refrigeration mechanism to deflect with first control signals provided by associated control circuitry so that engagement of its coacting contact means occurs to complete a circuit between the power source and terminal means of the refrigeration mechanism, and (c) providing second control signals to the bender element having terminal means connected to the defrost mechanism with the associated control circuitry which causes the bender element to deflect so that engagement of its coacting contact means occurs to complete a circuit between the power source and terminal means of the defrost mechanism.

143. The method of claim 142 wherein the defrost mechanism is operated for a predetermined time interval responsive to the second control signals and with operation of the defrost mechanism being initiated whenever a predetermined operating time interval of the refrigeration mechanism is exceeded.

144. The method of claim 142 wherein operation of the defrost mechanism responsive to the second control signals is further initiated following passage of a predetermined time interval subsequent to its preceding operation.

145. The method of claim 142 wherein operation of the defrost mechanism responsive to the second control signals is further initiated responsive to frost sensing means.

146. The method of claim 142 wherein the first control signals further provide thermal protection to the refrigeration mechanism.

147. The method of claim 142 wherein initation of the refrigeration mechanism responsive to the first control signals is delayed for a predetermined time interval following termination of the defrost mechanism.

148. A method for regulating electrical power input between the refrigeration mechanism and the defrost mechanism in an atmospheric cooling apparatus employing a pair of movable piezoceramic relay devices as the switching means comprising the steps of:

(a) connecting the pair of piezoceramic relay devices in circuit relationship enabling individual connection of the power source to an individual mechanism, one of the piezoceramic relay devices including terminal means for connection to the power source and a movable piezoceramic bender member having movable electrical contact means which coact with fixed electrical contact means disposed thereby to connect with terminal means of the refrigeration mechanism, with the remaining piezoceramic relay device including terminal means for connection to the power source and a movable piezoceramic bender member having movable electrical contact means which coact with fixed electrical contact means disposed thereby to connect with terminal means of the defrost mechanism, (b) causing the piezoceramic bender member having terminal means connected to the refrigeration mechanism to deflect with first control signals provided by associated circuitry so that engagement of its coacting contact means occurs to complete a circuit between the power source and terminal means of the refrigeration mechanism, and (c) providing second control signals to the relay device having terminal means connected to the defrost mechanism with the associated control circuitry which causes its bender member to deflect so that engagement of its coacting contact means occurs to complete a circuit between the power source and terminal means of the defrost mechanism.

149. The method of claim 148 wherein the defrost mechanism is operated for a predetermined time interval responsive to the second control signals and with operation of the defrost mechanism being initiated whenever a predetermined operating time interval of the refrigeration mechanism is exceeded.

150. The method of claim 148 wherein operation of the defrost mechanism responsive to the second control signals is further initiated following passage of a predetermined time interval subsequent to its preceding operation.

151. The method of claim 148 wherein operation of the defrost mechanism responsive to the second control signals is further initiated responsive to frost sensing means.

152. The method of claim 148 wherein the first control signals further provide thermal protection to the refrigeration mechanism.

153. The method of claim 148 wherein initiation of the refrigeration mechanism responsive to the first control signals is delayed for a predetermined time interval following termination of the defrost mechanism.

154. A method for regulating AC power input between the refrigeration mechanism and the defrost mechanism in an atmospheric cooling apparatus employing a movable piezoceramic relay device as the switching means comprising the steps of:
  (a) initiating operation of the refrigeration mechanism at one predetermined temperature with the AC power being applied when the electrical contact means of the movable piezoceramic relay device are moved to a first operating position,
  (b) sensing temperature achieved in the atmospheric cooling apparatus during operation of the refrigeration mechanism to derive first control signals representing the difference between the sensed temperature and a predetermined second lower temperature, the first control signals enabling a high voltage DC energization potential of predetermined polarity to be applied to the piezoceramic relay device,
  (c) applying the high voltage DC energization potential to the piezoceramic relay device until the sensed temperature difference reaches zero then terminating the high voltage DC energization potential which causes the electrical contacts of the piezoceramic relay device to open,
  (d) deriving second control signals whereby the time interval during which the defrost mechanism is operated is determined by the operating time interval of the refrigeration mechanism, the second control signals enabling a high voltage DC energization potential of opposite polarity to be applied to the piezoceramic relay device, and
  (e) applying the high voltage DC energization potential of opposite polarity to the piezoceramic relay device which causes the electrical contacts of the piezoceramic relay to move to a second operating position applying AC power to initiate operation of the defrost mechanism.

155. The method of claim 154 wherein the defrost mechanism is operated for a predetermined time interval responsive to the second control signals and with operation of the defrost mechanism being initiated whenever a predetermined operating time interval of the refrigeration mechanism is exceeded.

156. The method of claim 154 wherein operation of the defrost mechanism responsive to the second control signals is further initiated following passage of a predetermined time interval subsequent to its preceding operation.

157. The method of claim 154 wherein operation of the defrost mechanism responsive to the second control signals is further initiated responsive to frost sensing means.

158. The method of claim 154 wherein the first control signals further provide thermal protection to the refrigeration mechanism.

159. The method of claim 154 wherein initiation of the refrigeration mechanism responsive to the first control signals is delayed for a predetermined time interval following termination of the defrost mechanism.

160. The method of claim 154 including the further step of employing a voltage conversion circuit having a diode-capacitor network to increase the AC source voltage.

161. The method of claim 154 including the further step of providing the DC energization potential with the same polarity as the polarity of the potential used to initially polarize the piezoceramic relay device.

162. The method of claim 154 wherein the control signals are derived automatically with preprogrammed integrated circuit means.

163. A method for regulating AC power input between the refrigeration mechanism and the defrost mechanism in an atmospheric cooling apparatus employing a movable piezoceramic relay device as the switching means comprising the steps of:
  (a) selecting a piezoceramic relay device having a movable piezoceramic bender member which operates either side of a center position normally assumed by the bender member in an unenergized condition, the piezoceramic relay device further having first terminal means for connection to the power source, second terminal means enabling connection of the power source to the refrigeration mechanism in a first operating position, and third terminal means enabling connection of the power source to the defrost mechanism in a second operating position,
  (b) initiating operation of the refrigeration mechanism at one predetermined temperature when the electrical contact means of the movable piezoceramic relay device are moved to the first operating position completing an electrical circuit between the power source and terminal means connected to the refrigeration mechanism,
  (c) sensing temperature achieved in the atmospheric cooling apparatus during operation of the refrigeration mechanism to derive first control signals representing the difference between the sensed temperature and a predetermined second lower temperature, the first control signals enabling a high voltage DC energization potential of predetermined polarity to be applied to the piezoceramic relay device,
  (d) applying this high voltage DC energization potential to the piezoceramic relay device until the sensed temperature difference reaches zero then terminating the high voltage DC energization potential which causes the electrical contact means of the piezoceramic relay device to open,
  (e) deriving second control signals whereby the time interval during which the defrost mechanism is operated is determined by the operating time interval of the refrigeration mechanism, the second control signals enabling a high voltage DC energization potential of opposite polarity to be applied to the piezoceramic relay device,
  (f) applying the high voltage DC energization potential of opposite polarity to the piezoceramic relay device which causes the electrical contact means of the movable piezoceramic relay device to move to a second operating position completing an electrical circuit between the power source and terminal means connected to the defrost mechanism for initiation of the defrost cycle, and (g) terminating the high voltage DC energization potential of opposite polarity to the piezoceramic relay device after a predetermined time interval causing the electrical contact means of the piezoceramic relay device to open.

164. The method of claim 163 wherein the defrost mechanism is operated whenever a predetermined operating time interval of the refrigeration mechanism is exceeded.

165. The method of claim 163 wherein operation of the defrost mechanism responsive to the second control signals is further initiated following passage of a predetermined time interval subsequent to its preceding operation.

166. The method of claim 163 wherein operation of the defrost mechanism responsive to the second control signals is further initiated responsive to frost sensing means.

167. The method of claim 163 wherein the first control signals further provide thermal protection to the refrigeration mechanism.

168. The method of claim 163 wherein initiation of the refrigeration mechanism responsive to the first control signals is delayed for a predetermined time interval following termination of the defrost mechanism.

169. The method of claim 163 including the further step of employing a voltage conversion circuit having a diode-capacitor network to increase the AC source voltage.

170. The method of claim 163 including the further step of providing the DC energization potential with the same polarity as the polarity of the potential used to initially polarize the piezoceramic relay device.

171. The method of claim 163 wherein the control signals are derived automatically with preprogrammed integrated circuit means.

172. A method for regulating AC power input between the refrigeration mechanism and the defrost mechanism in an atmospheric cooling apparatus employing a movable piezoceramic relay device as the switching means comprising the steps of:

(a) selecting a single piezoceramic relay device connected in circuit relationship to enable individual connection of the power source to either refrigeration or defrost mechanisms, the piezoceramic relay device having a bifurcated construction with a pair of movable piezoceramic bender elements connected by terminal means to the power source, each of the bender elements having movable electrical contact means which coact with fixed electrical contact means disposed thereby, the fixed electrical contact means being separately connected to terminal means of the refrigeration and defrost mechanisms, (b) initiating operation of the refrigeration mechanism at one predetermined temperature when the coacting contact means of one bender element engage to complete a circuit between the power source and terminal means connected to the refrigeration mechanism, (c) sensing temperatures achieved in the atmocooling apparatus during operation of the refrigeration mechanism to derive first control signals representing the difference between the sensed temperature and a predetermined second lower temperature, the first control signals enabling a high voltage DC energization potential of predetermined polarity to be applied to the bender element having terminal means connected to the refrigeration mechanism, (d) applying the high voltage DC energization potential to the bender element having terminal means connected to the refrigeration mechanism until the sensed temperature difference reaches zero then terminating the high voltage DC energization potential which causes the coacting contact means of this bender element to open, (e) deriving second control signals whereby the time interval during which the defrost mechanism is operated is determined by the operating time interval of the refrigeration mechanism, the second control signals enabling a high voltage DC energization potential of predetermined polarity to be applied to the bender element having terminal means connected to the defrost mechanism, (f) applying the high voltage DC energization potential to the bender element having terminal means connected to the defrost mechanism which causes its coacting contact means to engage completing a circuit between the power source and terminal means connected to the defrost mechanism for initiation of the defrost cycle, and (g) terminating the high voltage DC energization potential to the bender element having terminal means connected to the defrost mechanism after a predetermined time interval causing its coacting contact means to open.

173. The method of claim 172 wherein the defrost mechanism is operated whenever a predetermined operating time interval of the refrigeration mechanism is exceeded.

174. The method of claim 172 wherein operation of the defrost mechanism responsive to the second control signals is further initiated following passage of a predetermined time interval subsequent to its preceding operation.

175. The method of claim 172 wherein operation of the defrost mechanism responsive to the second control signals is further initiated responsive to frost sensing means.

176. The method of claim 172 wherein the first control signals further provide thermal protection to the refrigeration mechanism.

177. The method of claim 172 wherein initiation of the refrigeration mechanism responsive to the first control signals is delayed for a predetermined time interval following termination of the defrost mechanism.

178. The method of claim 172 including the further step of employing a voltage conversion circuit having a diode-capacitor network to increase the AC source voltage.

179. The method of claim 172 including the further step of providing the DC energization potential with the same polarity as the polarity of the potential used to initially polarize the piezoceramic relay device.

180. The method of claim 172 wherein the control signals are derived automatically with preprogrammed integrated circuit means.

181. A method for regulating AC power input between the refrigeration mechanism and the defrost mechanism in an atmospheric cooling apparatus employing a pair of movable piezoceramic relay devices as the switching means comprising the steps of:

(a) connecting the pair of piezoceramic relay devices in circuit relationship enabling individual connection of the power source to an individual mechanism, one of the piezoceramic relay devices including terminal means for connection to the power source and a movable piezoceramic bender member having movable electrical contact means which coact with fixed electrical contact means disposed thereby to connect with terminal means of the refrigeration mechanism, the remaining piezoceramic relay device including terminal means for connection to the power source and a movable piezoceramic bender member having movable electrical contact means which coact with fixed electrical contact means disposed thereby to connect with terminal means of the defrost mechanism, (b) initiating operation of the refrigeration mechanism when the coacting contact means of the piezoceramic relay device having terminal means connected to the refrigeration mechanism engage to complete a circuit between the power source and the refrigeration mechanism, (c) sensing temperatures achieved in the atmospheric cooling apparatus during operation of the refrigeration mechanism to derive first control signals representing the difference between the sensed temperature and a predetermined second lower temperature, the first control signals enabling a high voltage DC energization potential of predetermined polarity to be applied to the piezoceramic relay device having terminal means connected to the refrigeration mechanism, (d) applying the high voltage DC energization potential to the piezoceramic relay device having terminal means connected to the refrigeration mechanism until the sensed temperature difference reaches zero then terminating the high voltage DC energization potential which causes the coacting contact means of the relay device to open, (e) deriving second control signals whereby the time interval during which the defrost mechanism is operated is determined by the operating time interval of the refrigeration mechanism, the second control signals enabling a high voltage DC energization potential of predetermined polarity to be applied to the piezoceramic relay device having terminal means connected to the defrost mechanism, (f) applying the high voltage DC energization potential to the relay device having terminal means connected to the defrost mechanism which causes its coacting contact means to engage completing a circuit between the power source and terminal means connected to the defrost mechanism for initiation of the defrost cycle, and (g) terminating the high voltage DC energization potential to the relay device having terminal means connected to the defrost mechanism after a predetermined time interval causing its coacting contact means to open.

182. The method of claim 181 wherein operation of the defrost mechanism responsive to the second control signals is further initiated responsive to frost sensing means.

183. The method of claim 181 wherein the first control signals further provide thermal protection to the refrigeration mechanism.

184. The method of claim 181 wherein initiation of the refrigeration mechanism responsive to the first control signals is delayed for a predetermined time interval following termination of the defrost mechanism.

185. The method of claim 181 including the further step of employing a voltage conversion circuit having a diode-capacitor network to increase the AC source voltage.

186. The method of claim 181 including the further step of providing the DC energization potential with the same polarity as the polarity of the potential used to initially polarize the piezoceramic relay device.

187. The method of claim 181 wherein the control signals are derived automatically with preprogrammed integrated circuit means.

* * * * *

UNITED STATES PATENT AND TRADEMARK OFFICE
CERTIFICATE OF CORRECTION

PATENT NO. : 4,967,568

DATED : November 6, 1990

INVENTOR(S) : John D. Harnden, Jr. et al.

It is certified that error appears in the above-identified patent and that said Letters Patent is hereby corrected as shown below:

In Column 36, line 47, "ramic," should be --ramic plate elements,--.

In column 51, line 65, "atmocooling" should be --atmospheric cooling--.

Signed and Sealed this

Thirteenth Day of October, 1992

Attest:

DOUGLAS B. COMER

Attesting Officer  Acting Commissioner of Patents and Trademarks